US011062219B1

(12) United States Patent
Griffin et al.

(10) Patent No.: US 11,062,219 B1
(45) Date of Patent: Jul. 13, 2021

(54) NONLINEAR OPTIMIZATION SYSTEM

(71) Applicant: SAS Institute Inc., Cary, NC (US)

(72) Inventors: Joshua David Griffin, Harrisburg, NC (US); Riadh Omheni, Raleigh, NC (US); Yan Xu, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/106,488

(22) Filed: Nov. 30, 2020

Related U.S. Application Data

(60) Provisional application No. 63/002,315, filed on Mar. 30, 2020.

(51) Int. Cl.
*G06N 5/04* (2006.01)
*G06N 20/00* (2019.01)

(52) U.S. Cl.
CPC .............. *G06N 5/04* (2013.01); *G06N 20/00* (2019.01)

(58) Field of Classification Search
None
See application file for complete search history.

(56) References Cited

PUBLICATIONS

Yamashita, Hiroshi. "A globally convergent primal-dual interior point method for constrained optimization." Optimization Methods and Software 10.2 (1998): 443-469. (Year: 1998).*

Gill, Philip E., and Daniel P. Robinson. "A primal-dual augmented Lagrangian." Computational Optimization and Applications 51.1 (2012): 1-25. (Year: 2012).*
Lei, Jinlong, Han-Fu Chen, and Hai-Tao Fang. "Primal-dual algorithm for distributed constrained optimization." Systems & Control Letters 96 (2016): 110-117. (Year: 2016).*
R. Polyak. Modied barrier functions (theory and methods). Math. Programming, 54(2, Ser. A):177-222, 1992.
P. Armand and R. Omheni. A globally and quadratically convergent primal-dual augmented lagrangian algorithm for equality constrained optimization. Optimization Methods and Software, 32(1):1{21, 2017.
P. Armand and R. Omheni. A mixed logarithmic barrier-augmented lagrangian method for nonlinear optimization. J. Optim. Theory Appl., 173(2):523{547, May 2017.

(Continued)

*Primary Examiner* — Daniel T Pellett
(74) *Attorney, Agent, or Firm* — Bell & Manning, LLC

(57) ABSTRACT

A computer solves a nonlinear optimization problem. An optimality check is performed for a current solution to an objective function that is a nonlinear equation with constraint functions on decision variables. When the performed optimality check indicates that the current solution is not an optimal solution, a barrier parameter value is updated, and a Lagrange multiplier value is updated for each constraint function based on a result of a complementarity slackness test. The current solution to the objective function is updated using a search direction vector determined by solving a primal-dual linear system that includes a dual variable for each constraint function and a step length value determined for each decision variable and for each dual variable. The operations are repeated until the optimality check indicates that the current solution is the optimal solution or a predefined number of iterations has been performed.

30 Claims, 5 Drawing Sheets

(56) References Cited

PUBLICATIONS

P. Armand, J. Benoist, R. Omheni, and Vincent Pateloup. Study of a primal-dual algorithm for equality constrained minimization. Computational Optimization and Applications, 59(3):405{433, 2014.

A. Ben-Tal and M. Zibulevsky. Penalty/barrier multiplier methods for convex programming problems. SIAM Journal on Optimization, 7(2):347{366, 1997.

M. G. Breitfeld and D. F. Shanno. Computational experience with penalty-barrier methods for nonlinear programming. Ann. Oper. Res., 62:439{463, 1996. Interior point methods in mathematical programming.

G. Nash, R. Polyak, and A. Sofer. A numerical comparison of barrier and modified barrier methods for large-scale bound-constrained optimization. In Large scale optimization (Gainesville, FL, 1993), pp. 319-338. Kluwer Acad. Publ., Dordrecht, 1994.

R. Silva, J. Soares, and L. N. Vicente. Local analysis of the feasible primal-dual interior-point method. Comput. Optim. Appl., 40(1):41{57, 2008.

A. R. Conn, Nick Gould, and Ph. L. Toint. A globally convergent lagrangian barrier algorithm for optimization with general inequality constraints and simple bounds. Math. of Computation, 66:261{288, 1992.

A. Wachter and L. T. Biegler. On the implementation of an interior-point filter linesearch algorithm for large-scale nonlinear programming. Math. Program., 106(1, Ser. A):25{57, 2006.

Chapter 4 of a book by Golub, G. H., and C. F. Van Loan, Matrix Computations, 3rd ed. (Johns Hopkins University Press 1996).

G. Breitfeld and D. F. Shanno. Preliminary Computational experience with modified log-barrier Functions for Large-scale Nonlinear Programming, Rutcor Research Report, Jul. 1993.

Byrd et al., "A trust region method based on interior point techniques for nonlinear programming," Math. Program., Ser. A 89: 149-185 (2000).

Dolan et al., "Benchmarking optimization software with performance profiles," Math. Program., Ser. A 91:201-213 (2002).

Goldfarb et al., "A Modified Barrier-Augmented Lagrangian Method for Constrained Minimization," Computational Optimization and Applications 14, 55-74 (1999).

Griffin et al, "A primal-dual modified log-barrier method for inequality constrained nonlinear optimization," Optimization Letters, published Mar. 10, 2020.

W. Murray, "Analytical Expressions for the Eigenvalues ane Eigenvectors of the Hessian Matrices of Barrier and Penalty Functions," Journal of Optimization Theory and Applications: vol. 7, No. 3, 1971.

Shanno et al., "Interior-point methods for nonconvex nonlinear programming: orderings and higher-order methods," Math. Progam., Ser. B 87:303-316 (2000).

Backtracking line search, Wikipedia, retrieved from https://en.wikipedia.org/w/index.php?title=Backtracking_line_search&oldid=960063023, last edited on May 31, 2020.

SAS/OR 15.1 User's Guide Mathematical Programming The OPTMODEL, SAS Institute Inc, 2018.

Griffin et al., "An Efficient Primal-Dual Modified Barrier Method for Nonlinear Optimization with Inequality Constraints," SAS Institute, Mar. 26, 2020.

\* cited by examiner

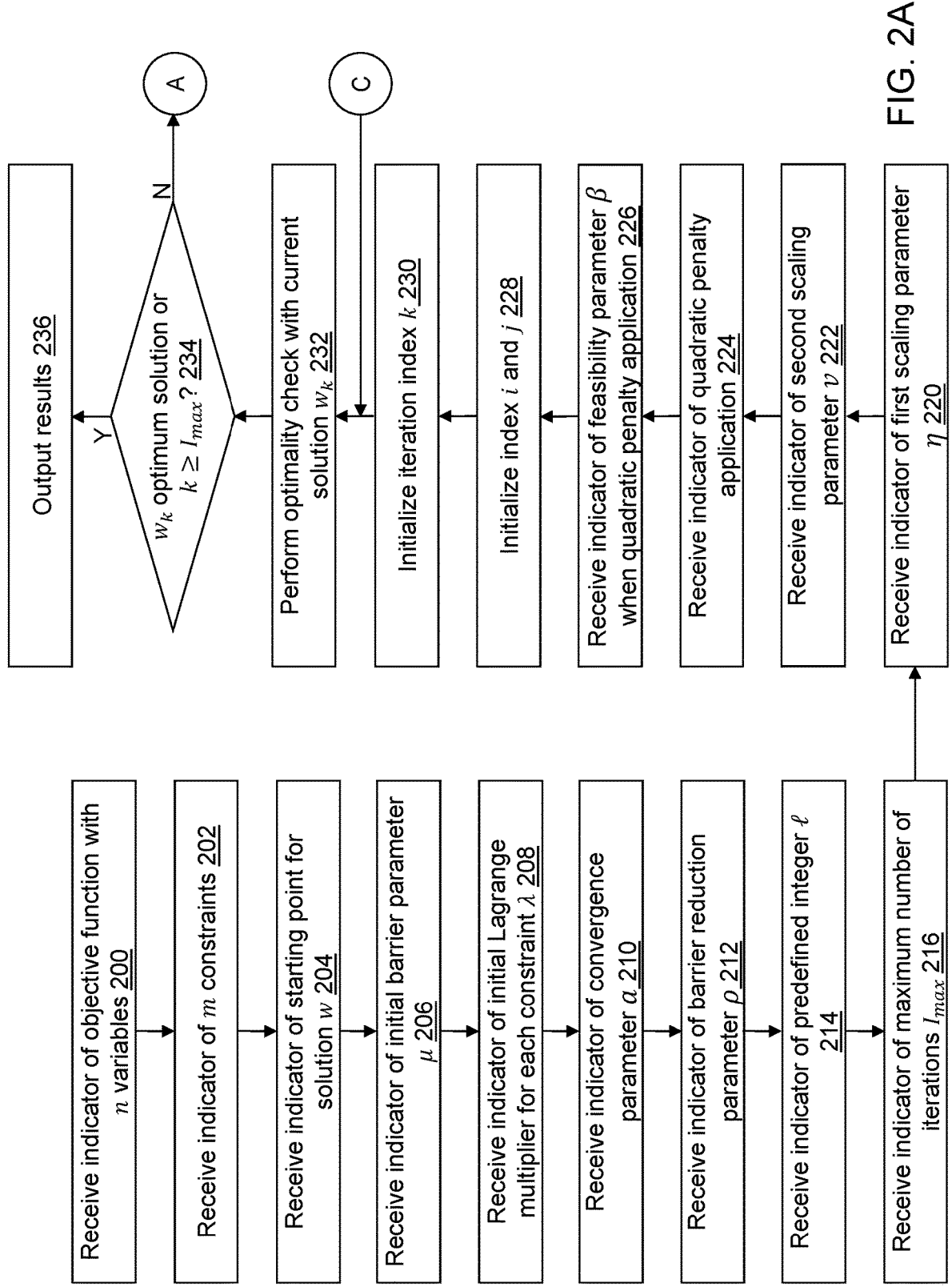

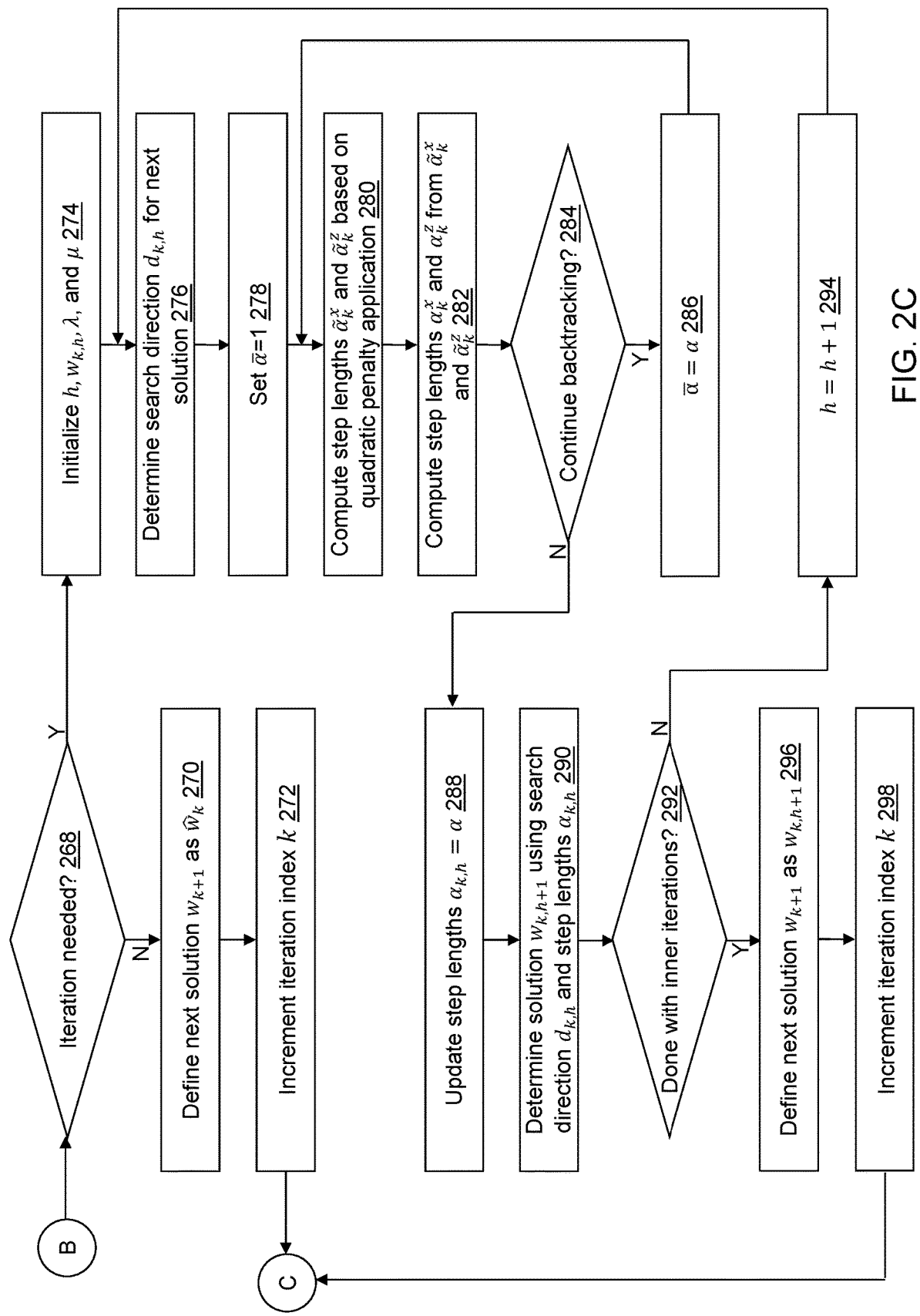

NONLINEAR OPTIMIZATION SYSTEM

CROSS-REFERENCE TO RELATED APPLICATIONS

The present application claims the benefit of and priority to 35 U.S.C. § 119(e) to U.S. Provisional Patent Application No. 63/002,315 filed Mar. 30, 2020, the entire contents of which are hereby incorporated by reference.

BACKGROUND

The most straightforward way to handle inequality constraints in an optimization problem consists of transforming the inequality constraints into equality constraints by subtracting a vector of slack variables. The main benefit of this transformation is the ability to find an easy feasible starting point for interior-point based approaches. The second approach for handling inequality constraints consists of placing them into a barrier function. The most common two examples of barrier functions are the log-barrier function and the inverse barrier function. The log-barrier is usually preferred because the logarithm increases so slowly as the boundary is approached. The classical log-barrier (CLB) method transforms the optimization problem with inequality constraints to an unconstrained subproblem. The main difficulty associated with the CLB method is finding a strictly feasible starting point because finding the strictly feasible starting point has the same complexity as solving the original optimization problem with inequality constraints. Furthermore, it has been shown that a Hessian matrix of the log-barrier function becomes increasingly ill-conditioned as the barrier parameter converges to zero. As a result, CLB methods were quickly abandoned by practitioners.

As an alternative to CLB methods, a new method based on a modified log-barrier (MLB) function was introduced that eliminates most of the deficiencies associated with the CLB method while retaining its best features. However, though MLB methods may exhibit strong convergence properties, they require shifting a starting point via an auxiliary problem after updating the barrier parameter. The MLB method further has singularities at its boundary leading to numerical difficulties that prevent the algorithm from performing well when approaching the solution.

SUMMARY

In an example embodiment, a computer-readable medium is provided having stored thereon computer-readable instructions that when executed by a computing device, cause the computing device to determine a solution to a nonlinear optimization problem. (A) An optimality check is performed for a current solution to a predefined objective function. The predefined objective function is a nonlinear equation with a plurality of decision variables. (B) When the performed optimality check indicates that the current solution is an optimal solution, the optimal solution to the predefined objective function is output. The optimal solution includes a value for each decision variable of the plurality of decision variables that optimizes a result of the predefined objective function.

When the performed optimality check indicates that the current solution is not the optimal solution, (C) a complementarity slackness test is performed with the current solution; (D) based on the result of the performed complementarity slackness test, a barrier parameter value is updated and a Lagrange multiplier value is updated for each constraint function of a plurality of constraint functions defined for objective function optimization; (E) a search direction vector is determined by solving a primal-dual linear system that includes a dual variable defined for each constraint function of the plurality of constraint functions; (F) a step length value is determined for each decision variable of the plurality of decision variables and for each dual variable of the plurality of dual variables based on the updated barrier parameter value; (G) the current solution to the predefined objective function is updated using the determined search direction vector and the determined step length value for each decision variable of the plurality of decision variables and for each dual variable of a plurality of dual variables; and (H) (A) to (G) are repeated until the performed optimality check indicates that the current solution is the optimal solution or a predefined number of iterations of (D) has been performed.

Each constraint function applies one or more of the plurality of decision variables. The search direction vector includes a direction value for each decision variable of the plurality of decision variables and for each dual variable of a plurality of dual variables. The search direction vector is determined based on the updated barrier parameter value and the updated Lagrange multiplier value for each constraint function of a plurality of constraint functions.

In another example embodiment, a computing device is provided. The computing device includes, but is not limited to, a processor and a computer-readable medium operably coupled to the processor. The computer-readable medium has instructions stored thereon that, when executed by the processor, cause the computing device to determine a solution to a nonlinear optimization problem.

In yet another example embodiment, a method of determining a solution to a nonlinear optimization problem is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIGS. 2A, 2B, and 2C depict a flow diagram illustrating examples of operations performed by a nonlinear optimization application of the nonlinear optimization device of FIG. 1 in accordance with an illustrative embodiment.

DETAILED DESCRIPTION

Figure 1:
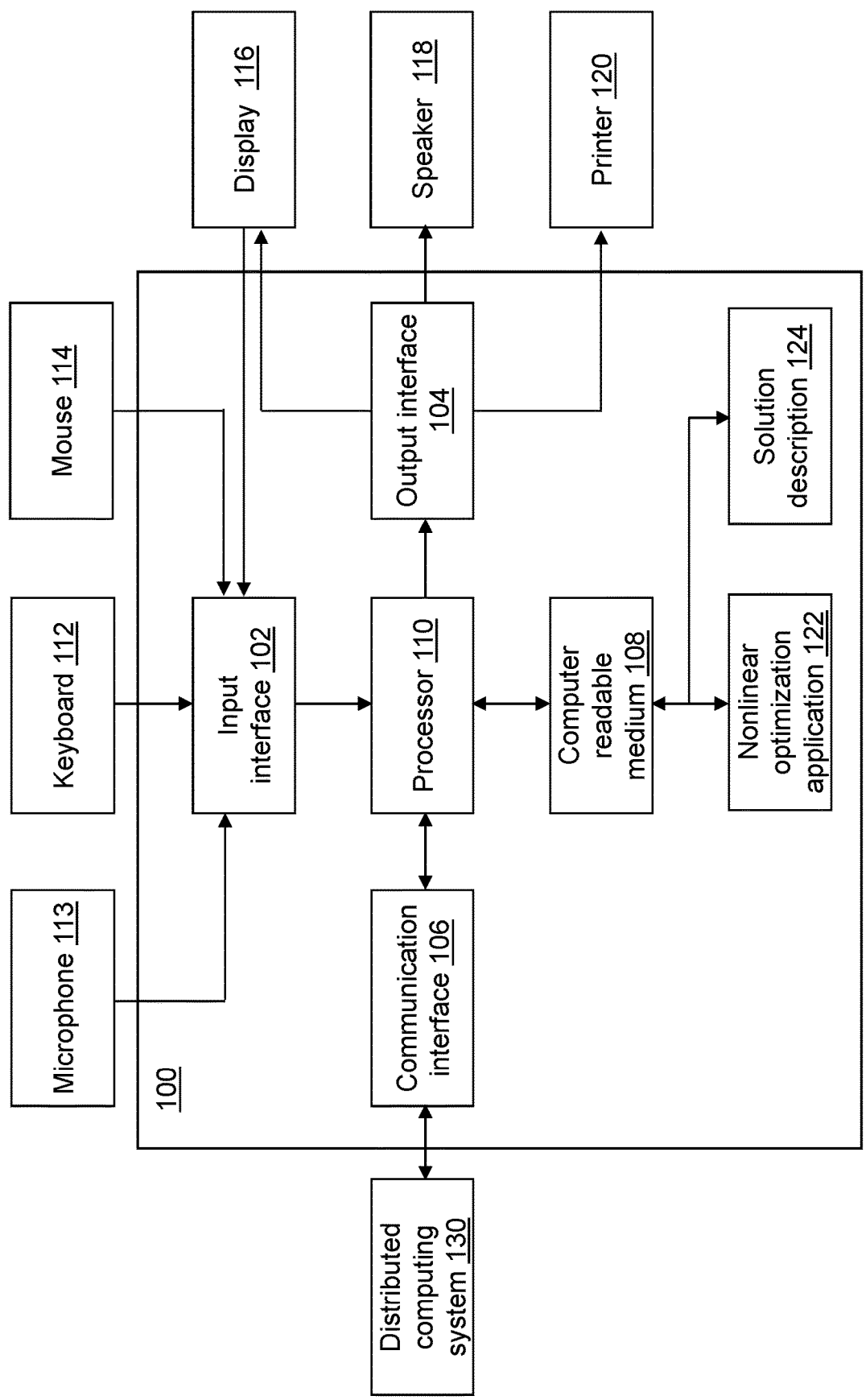
FIG. 1 depicts a block diagram of a nonlinear optimization solution device in accordance with an illustrative embodiment.

Referring to FIG. 1, a block diagram of a nonlinear optimization device 100 is shown in accordance with an illustrative embodiment. Nonlinear optimization device 100 may include an input interface 102, an output interface 104, a communication interface 106, a non-transitory computer-readable medium 108, a processor 110, a nonlinear optimization application 122, and a solution description 124.

Fewer, different, and/or additional components may be incorporated into nonlinear optimization device 100.

Input interface 102 provides an interface for receiving information from the user or another device for entry into nonlinear optimization device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into nonlinear optimization device 100 or to make selections presented in a user interface displayed on display 116.

The same interface may support both input interface 102 and output interface 104. For example, display 116 comprising a touch screen provides a mechanism for user input and for presentation of output to the user. Nonlinear optimization device 100 may have one or more input interfaces that use the same or a different input interface technology. The input interface technology further may be accessible by nonlinear optimization device 100 through communication interface 106.

Output interface 104 provides an interface for outputting information for review by a user of nonlinear optimization device 100 and/or for use by another application or device. For example, output interface 104 may interface with various output technologies including, but not limited to, display 116, a speaker 118, a printer 120, etc. Nonlinear optimization device 100 may have one or more output interfaces that use the same or a different output interface technology. The output interface technology further may be accessible by nonlinear optimization device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Nonlinear optimization device 100 may have one or more communication interfaces that use the same or a different communication interface technology. For example, nonlinear optimization device 100 may support communication using an Ethernet port, a Bluetooth antenna, a telephone jack, a USB port, etc. Data and/or messages may be transferred between nonlinear optimization device 100 and another computing device of a distributed computing system 130 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Nonlinear optimization device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Nonlinear optimization device 100 also may have one or more drives that support the loading of a memory media such as a CD, DVD, an external hard drive, etc. One or more external hard drives further may be connected to nonlinear optimization device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Nonlinear optimization device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit (GPU), an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Nonlinear optimization application 122 performs operations associated with defining solution description 124 that describes a solution to a nonlinear optimization problem with inequality constraints. Some or all of the operations described herein may be embodied in nonlinear optimization application 122. The operations may be implemented using hardware, firmware, software, or any combination of these methods.

Referring to the example embodiment of FIG. 1, nonlinear optimization application 122 is implemented in software (comprised of computer-readable and/or computer-executable instructions) stored in computer-readable medium 108 and accessible by processor 110 for execution of the instructions that embody the operations of nonlinear optimization application 122. Nonlinear optimization application 122 may be written using one or more programming languages, assembly languages, scripting languages, etc. Nonlinear optimization application 122 may be integrated with other analytic tools. As an example, nonlinear optimization application 122 may be part of an integrated data analytics software application and/or software architecture such as that offered by SAS Institute Inc. of Cary, N.C., USA that solve nonlinear optimization problems individually and as part of training models. Merely for illustration, nonlinear optimization application 122 may be implemented as part of one or more SAS software tools such as JMP®, Base SAS, SAS® Enterprise Miner™, SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services (CAS), SAS/OR®, SAS/ETS®, SAS® Visual Analytics, SAS® Viya™, SAS In-Memory Statistics for Hadoop®, etc. all of which are developed and provided by SAS Institute Inc. of Cary, N.C., USA. Data mining, statistical analytics, and response prediction are practically applied in a wide variety of industries to solve technical problems.

Nonlinear optimization application 122 may be implemented as a Web application. For example, nonlinear optimization application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Nonlinear optimization application 122 provides an optimization that is a search for a maximum or a minimum of an objective function (also called a cost function), where search variables are restricted by particular constraints, where the constraints define a feasible region for the solution. A Lagrange function for the problem minimize $f(x)$ subject to $c(x) \geq 0$ is defined by $\mathcal{L}(x, z) = f(x) - c(x)^T z$, where $\mathcal{L}(x,z)$ indicates the Lagrange function, x indicates one or more decision variables, $f(x)$ indicates the objective function, $c(x)$ indicates a set of one or more constraint functions applied to the optimization of the objective function, T indicates a transpose, and z indicates one or more dual variables defined for each constraint function of the one or more constraint functions. The maximum of $f(x)$ is simply a negation of the minimum of $-f(x)$. The objective function is a mathematical formula defined using a set of one or more variables x called optimization variables or decision variables. The one or more constraint functions are mathematical formulas that may include equalities (=) and inequalities (<, >, ≤, ≥) required to be simultaneously satisfied based on values for the one or more variables x. A problem is said to be linearly constrained if the functions in the constraints are linear. A linear programming problem is a linearly constrained problem with a linear objective function. A nonlinear programming problem occurs where some function in the objective function or constraint functions is nonlinear. The objective function and/or constraint functions may include one or more polynomial functions. For illustration, the optimization problem may be defined as minimize $f(x_1,x_2)=100(x_2-x_1^2)^2+(1-x_1)^2$ subject to $x_1 \geq 5$ and $x_1+5x_2 \geq 76$, where $x_1$ and $x_2$ are decision variables, and $x_1 \geq 5$ and $x_1+5x_2 \geq 76$ are two constraint functions.

A feasible solution for the one or more decision variables x minimizes an objective function value and is called an optimal solution to the optimization problem, and the corresponding objective value is called the optimal value. Nonlinear optimization application 122 varies values for the optimization variables when searching for the optimal value for the objective function that is output to solution description 124. The solution may further be sent to a calling function, for example, of a model training process such as for training a neural network model, a support vector machine model, etc.

For two real vectors x and y of the same length, a Euclidean scalar product can be denoted by $x^T y$. A Euclidean norm can be defined as $\|x\|=(x^T x)^{1/2}$. A positive part of a real number t is a function defined by $t^+=\max\{t, 0\}$. $\nabla f(x) \in \mathbb{R}^n$ indicates a gradient of $f$ at x. $\nabla c(x)^T$ indicates a Jacobian matrix of c at x, and is an m×n matrix, whose $i^{th}$ row is a vector $\nabla c_i(x)^T$, where m is a number of the one or more constraint functions, and n is a number of the one or more decision variables. $C(x)$ and $Z$ are diagonal matrices whose diagonal entries are given by the components of $c(x)$ and z, respectively, e is a vector of all ones. A gradient and a Hessian of $\mathcal{L}(x,z)$ with respect to the primal-dual variables $(x,z)$ can be defined as $\nabla_x \mathcal{L}(x, z) = \nabla f(x) - \nabla c(x) z$ and $$\nabla_x^2 \mathcal{L}(x, z) = \nabla^2 f(x) - \sum_{i=1}^{m} z_i \nabla^2 c_i(x),$$

respectively, where $\nabla_x^2$ indicates a Hessian computation with respect to x, and $\nabla_x$ indicates a derivative computation with respect to x.

The first order optimality conditions, also called Karush-Khun-Tucker (KKT) conditions, for the problem minimize $f(x)$ subject to $c(x) \geq 0$ can be defined by $$\begin{pmatrix} \nabla f(x) - \nabla c(x) z \\ C(x) Z e \end{pmatrix} = \begin{pmatrix} 0 \\ 0 \end{pmatrix}, c(x) \geq 0 \text{ and } z \geq 0.$$

A paper by R. Polyak, Modified *barrier functions* (*theory and methods*), Mathematical Programming, Volume 54, Issue 2, Series A, pp. 177-222 (Feb. 1992) proposed the following MLB function associated with solving the problem minimize $f(x)$ subject to $c(x) \geq 0$ $$M_{\lambda,\mu}(x) := f(x) - \mu \sum_{i \in \mathfrak{I}} \lambda_i \log\left(\frac{c_i(x)}{\mu} + 1\right) \quad (1)$$

where $\mathfrak{I} = \{1, \ldots, m\}$, $\lambda$ is a vector of positive estimates of m Lagrange multipliers, $\mu > 0$ is a barrier parameter value, $\lambda_i$ is an $i^{th}$ Lagrange multiplier, $c_i(x)$ is an $i^{th}$ constraint function, and m is a number of constraint functions included in $c(x)$. The MLB method solves the problem minimize $f(x)$ subject to $c(x) \geq 0$ by solving a sequence of unconstrained minimization problems $$\min_{x \in \mathbb{R}^n} M_{\lambda,\mu}(x),$$

where n is a number of decision variables included in $f(x)$. The KKT conditions for solving the sequence of unconstrained minimization problems is $$\nabla f(x) - \sum_{i \in I} \frac{\mu \lambda_i}{c_i(x) + \mu} \nabla c_i(x) = 0.$$

In the present application, $$z_i = \frac{\mu \lambda_i}{c_i(x) + \mu},$$

$i=1, \ldots m$ is introduced where $z_i$ is an $i^{th}$ dual variable value paired with an $i^{th}$ constraint function $c_i(x)$, $$r(w, \lambda, \mu) := \begin{pmatrix} \nabla f(x) - \nabla c(x)z \\ C(x)Ze + \mu(z - \lambda) \end{pmatrix} = \begin{pmatrix} 0 \\ 0 \end{pmatrix}. \quad (2)$$

These conditions appear as a perturbation of the KKT conditions of the initial problem. Nonlinear optimization application 122 applies a Newton-like method to equation (2) while updating X and p to guarantee a global convergence. Nonlinear optimization application 122 is more flexible than the CLB method and offers two possibilities to ensure the convergence to a point for which the KKT conditions are satisfied: 1) reduce the barrier parameter or 2) update the Lagrange multiplier estimate. Using the CLB method, only the barrier parameter is driven to zero.

Nonlinear optimization application 122 executes an outer iteration and an inner iteration. A solution vector $w_k = (x_k, z_k)$ is associated with a $k^{th}$ outer iteration, where $x_k$ is a $k^{th}$ one or more decision variables, $z_k$ is a $k^{th}$ one or more dual variables paired with a $k^{th}$ one or more constraint functions. A minimization process starts by updating $\lambda_k$ and $p_k$ depending on a progress toward a complementarity slackness, where $\lambda_k$ is a $k^{th}$ estimate of each Lagrange multiplier of the plurality of Lagrange multiplier, $\mu_k$ is a $k^{th}$ barrier parameter value, and $\|C(x_k)z_k\| \leq \alpha \|C(x_{k-1})z_{k-1}\|$ is a complementarity slackness test used to determine how $\lambda_k$ and $\mu_k$ are updated, where $\alpha \in (0,1)$. When $\|(x_k)z_k\| \leq \alpha \|C(x_{k-1})z_{k-1}\|$, the Lagrange multiplier estimate is updated by setting $\lambda_{k+1} = z_k$, and the barrier parameter is updated by setting $\mu_{k+1} \leq \mu_k$. When $\|C(x_k)z_k\| \geq \alpha \|C(x_{k-1})z_{k-1}\|$, the barrier parameter is updated by setting $\mu_{k+1} \leq \rho \mu_k$ and the Lagrange multiplier is updated by setting $\lambda_{k+1} = \lambda_k$ to ensure that it does not behave badly far from a solution. The complementarity slackness test used to measure the progress achieved by the $k^{th}$ outer iteration may be too demanding especially for nonlinear optimization. As a result, a condition based on a non-monotonic decrease of the complementarity slackness may be used instead as defined by $$\|C(x_k)z_k\| \leq \alpha \max\{\|C(x_{ij})z_{ij}\|:(k-\ell)^+ \leq j \leq k\} + \zeta_k \quad (3)$$

where $\ell \geq 1$, $\{i_k\}$ is a sequence whose elements are the iteration indices at which $\lambda_{k+1} = z_k$ (or $\|C(x_k)z_k\| \leq \alpha \|C(x_{k-1})z_{k-1}\|$) and $\{\zeta_k\}$ is a first sequence that converges to zero.

After updating $\mu_k$ and $\lambda_k$, a search direction $d = \{d_x, d_z\}$ is computed by solving the following primal-dual linear system $$\begin{pmatrix} \nabla_x^2 \mathcal{L}(w_k) & -\nabla c(x_k) \\ Z_k \nabla c(x_k)^T & C(x_k) + \mu_{k+1} I \end{pmatrix} \begin{pmatrix} d_x \\ d_Z \end{pmatrix} = -\begin{pmatrix} \nabla_x \mathcal{L}(w_k) \\ Z_k C(x_k)e + \mu_{k+1}(z_k - \lambda_{k+1}) \end{pmatrix} \quad (4)$$

where T indicates a transpose. This corresponds to the result of applying a Newton-like method to equation (2). Setting $\lambda_{k+1} = z_k$, the linear system appears as a regularized Newton method applied to the KKT conditions of the initial problem. Hence a high rate of convergence is expected provided that the parameters are correctly updated and the Jacobian constraint is of full rank. The complementarity slackness test is used to ensure that the update $\lambda_{k+1} = z_k$ occurs as often as possible, where the Jacobian constraint is defined using $$J(w_k, \mu_{k+1}) := \begin{pmatrix} \nabla_x^2 \mathcal{L}(w_k) & -\nabla c(x_k) \\ Z_k \nabla c(x_k)^T & C(x_k) + \mu_{k+1} I \end{pmatrix}.$$

The linear system defined by equation (4) can be written as $J(w_k, \mu_{k+1})d = -r(w_k, \lambda_{k+1}, \mu_{k+1})$. After the step computation, a new iteration is defined by $\hat{x}_k = x_k + \alpha_k^x d_k^x$ and $\hat{z}_k = z_k + \alpha_k^z d_k^z$, where the step lengths $\alpha_k^x$ and $\alpha_k^x$ are computed such that $$\frac{c(x_k + \alpha_k^x d_k^x)}{\mu_{k+1}} + 1 > 0 \quad (5)$$

and $$z_k + \alpha_k^z d_k^z > 0 \quad (6)$$

To decide whether the candidate iterate $\hat{w}_k$ is selected, the following criterion is tested $\|r(\hat{w}_k, \lambda_{k+1}, \mu_{k+1})\| \leq \varepsilon_k$, where $\{\varepsilon_k\}$ is a second sequence that converges to zero. If $\|r(\hat{w}_k, \lambda_{k+1}, \mu_{k+1})\| > \varepsilon_k$, a sequence of inner iterations to find $w_{k+1}$ satisfying $\|r(w_{k+1}, \lambda_{k+1}, \mu_{k+1})\| \leq \varepsilon_k$ is performed. The sequence of inner iterations minimize a new primal-dual merit function $\Phi_{\lambda,\mu}(w) = \mathcal{M}_{\lambda,\mu}(x) + \eta \Psi_{\lambda,\mu}(w)$ with fixed values of the Lagrange multiplier estimate and the barrier parameter where $\eta \geq 0$ is a first scaling parameter and $$\Psi_{\lambda,\mu}(w) = \mu \sum_{i \in I} \left( \frac{(c_i(x) + \mu)z_i}{\mu \lambda_i} - \log\left( \frac{(c_i(x) + \mu)z_i}{\mu \lambda_i} \right) \right).$$

The control of iterates is performed in both primal and dual spaces during the minimization process including the inner iterations.

For the logarithmic term to be well defined, the following inequality should be satisfied $$\frac{c_i(x)}{\mu} + 1 > 0, \forall i \in I.$$

Due to non-convexity, the inequality $$\frac{c_i(x)}{\mu} + 1 > 0$$

can restrict how quickly the barrier parameter p can be reduced. This situation mainly occurs when the complementarity slackness test is not satisfied and the current values of the constraints do not allow the barrier parameter $\mu$ to be reduced by a large factor. To respond to this occurrence, a quadratic extrapolation is applied by modifying a definition of the function $\mathcal{M}$ by distinguishing two cases based on the infeasibility of the current iterate:

$$\mathcal{M}(x) = f(x) - \mu \sum_{i \in I} \lambda_i \begin{cases} \log\left(\frac{c_i(x)}{\mu} + 1\right) & \text{if } c_i(x) \geq -\beta\mu, \quad (7a) \\ \frac{1}{2}q^a(c_i(x))^2 + q^b c_i(x) + q^c & \text{if } c_i(x) < -\beta\mu, \quad (7b) \end{cases}$$

where $0 \leq \beta \leq 1$ and the coefficients $q^a$, $q^b$, $q^c$ are given by $$q^a = \frac{-1}{(\mu(1-\beta))^2}, \; q^b = \frac{1-\beta}{\mu(1-\beta)^2}, \text{ and } q^c = \frac{\beta(2-3\beta)}{2(1-\beta)^2} + \log(1-\beta).$$

In an illustrative embodiment, $\beta=0.9$. Whenever a "large" infeasibility is detected using $c_i(x) < -\beta\mu$, the quadratic extrapolation term for the corresponding constraint may be used. In this manner, quadratic approximations may be seen as a penalty rather than a barrier. In other words, if the $i^{th}$ constraint function becomes increasingly infeasible, the constraint is penalized using a quadratic term. Let $\mathcal{B}$ and $Q$ be two non-intersecting index sets denoting the set of constraints that satisfy $c_i(x) \geq -\beta\mu$ and $c_i(x) < -\beta\mu$, respectively. The linear system $J(w_{k,h}, \mu_k)d = -r(w_{k,h}, \lambda_k, \mu_k)$ has the following form $$\begin{pmatrix} \nabla_x^2 \mathcal{L}(w) & -\nabla c_{\mathcal{B}}(x) & -\nabla c_Q(x) \\ Z_{\mathcal{B}} \nabla c_{\mathcal{B}}(x)^\top & c_{\mathcal{B}}(x) + \mu I & 0 \\ \mu q^a \Lambda_Q c_Q(x)^\top & 0 & -I \end{pmatrix} \begin{pmatrix} d_x \\ d_{z_{\mathcal{B}}} \\ d_{z_Q} \end{pmatrix} =$$

$$-\begin{pmatrix} \nabla_x \mathcal{L}(w) \\ C_{\mathcal{B}}(x) Z_{\mathcal{B}} e + \mu(z_{\mathcal{B}} - \lambda_{\mathcal{B}}) \\ \mu \Lambda_Q (q^a c_Q(x) + q^b e) - z_Q \end{pmatrix},$$

where $\Lambda_{\mathcal{B}} = \text{diag}(\lambda_{\mathcal{B}})$. During the inner iterations, the following merit function is applied $$\Phi(w) = \mathcal{M}(x) + \nu\mu \sum_{i \in \mathcal{B}} \left(\frac{(c_i(x) + \mu)z_i}{\mu\lambda_i} - \log\left(\frac{(c_i(x) + \mu)z_i}{\mu\lambda_i}\right)\right),$$

where $\nu$ is a second scaling parameter.

Methods for solving nonlinear optimization problems may be classified into two classes: primal and primal-dual. Using the substitution $$z_i = \frac{\mu\lambda_i}{c_i(x) + \mu}$$

is a starting point for introducing a primal-dual framework in the context of the MLB method. Nonlinear optimization application 122 implements the MLB method in the primal-dual space. The control of the iterates is done in both primal and dual spaces during the entire minimization process, including the globalization phase corresponding to an inner algorithm. A new primal-dual merit function is used, and an estimate of the Lagrange multipliers is updated depending on a progress made by the iterates towards a complementarity slackness.

Figure 2B:
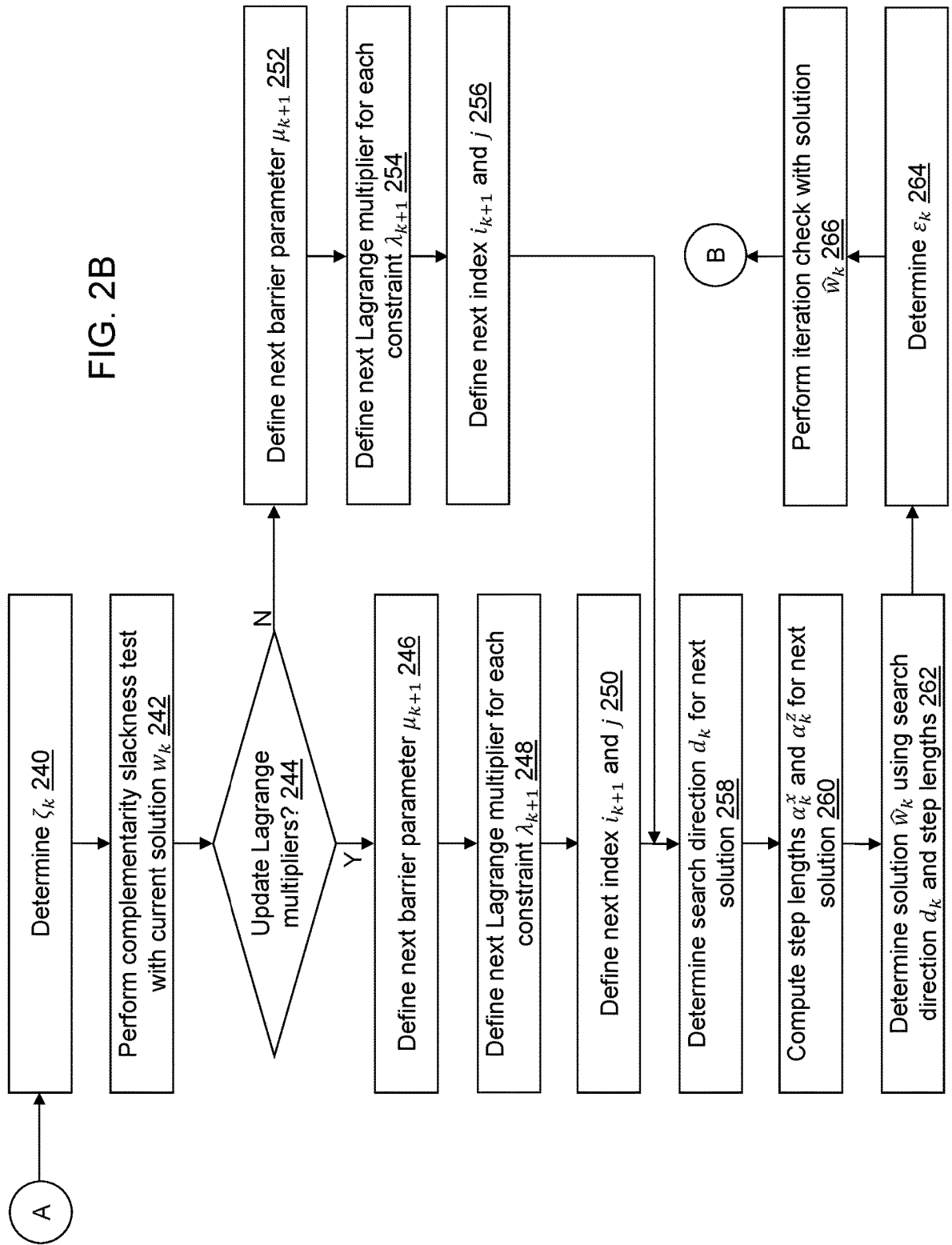

Referring to FIGS. 2A to 2C, example operations associated with nonlinear optimization application 122 are described when training dataset 124 is stored on nonlinear optimization device 100. Additional, fewer, or different operations may be performed depending on the embodiment of nonlinear optimization application 122. The order of presentation of the operations of FIGS. 2A to 2C is not intended to be limiting. Some of the operations may not be performed in some embodiments. Although some of the operational flows are presented in sequence, the various operations may be performed in various repetitions and/or in other orders than those that are illustrated. For example, a user may execute nonlinear optimization application 122, which causes presentation of a first user interface window, which may include a plurality of menus and selectors such as drop-down menus, buttons, text boxes, hyperlinks, etc. associated with nonlinear optimization application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by nonlinear optimization application 122. The operations of nonlinear optimization application 122 further may be performed in parallel using a plurality of threads and/or a plurality of worker computing devices.

In operation 200, a first indicator of an objective function $f(x_i)$, $i=1, \ldots, n$ may be received, where n is a number of decision variables the values of which are to be computed by optimization based on minimization or maximization. In an alternative embodiment, the first indicator may not be received. For example, the objective function may be stored, for example, in computer-readable medium 108 and used automatically. The objective function is defined by a nonlinear equation that is not defined by a line when graphed.

In an operation 202, a second indicator may be received that indicates a set of constraint functions $c_i(x)$, $i=1, \ldots, m$, where m is a number of constraint functions. Each constraint function may be an equation that defines an equality (=) or an inequality (<, >, ≤, ≥) with constant values and one or more of the decision variables. At least one of the constraint functions includes an inequality. In an alternative embodiment, the second indicator may not be received. For example, the set of constraint functions may be stored, for example, in computer-readable medium 108 and used automatically.

In an operation 204, a third indicator may be received that indicates a solution starting point $w_0 = (x_0, z_0)$ for searching for the optimum solution using the primal x and dual z, where $x_0$ is a primal vector $x_{0,i}$, $i=1, \ldots, n$, and $z_0$ is a dual vector $z_{0,i}$, $i=1, \ldots, m$, where $n \geq 1$ and $m \geq 1$. In an alternative embodiment, the third indicator may not be received or selectable. For example, the starting point $w_0 = (x_0, z_0)$ may be stored, for example, in computer-readable medium 108 and used automatically. For illustration, the primal vector is initialized to all zeroes and the dual vector is initialized to all ones.

In an operation 206, a fourth indicator may be received that indicates an initial barrier parameter $\mu_0 > 0$. In an alternative embodiment, the fourth indicator may not be received. For example, the initial barrier parameter $\mu_0$ may be stored, for example, in computer-readable medium 108 and used automatically. For illustration, $\mu_0 = \max(-c_i(x_0) + 0.1, 0.1)$, which guarantees that $$\frac{c(x_0)}{\mu_0} + e \geq 0$$

to ensure that the barrier term is well defined, where e is a vector of all ones.

In an operation 208, a fifth indicator may be received that indicates an initial Lagrange multiplier value for each constraint function $\lambda_{0,i} > 0$, i=1, ..., m, where $\lambda_0$ is a Lagrange multiplier vector. In an alternative embodiment, the fifth indicator may not be received. For example, the initial Lagrange multiplier value for each constraint $\lambda_{0,i}$, i=1, ..., m may be stored, for example, in computer-readable medium 108 and used automatically. For illustration, $\lambda_{0,i}=1$.

In an operation 210, a sixth indicator may be received that indicates a value for a convergence parameter a. In an alternative embodiment, the sixth indicator may not be received. For example, the value for the convergence parameter a may be stored, for example, in computer-readable medium 108 and used automatically. The convergence parameter a should be chosen such that a e (0,1), which guarantees that a right hand-side of equation (3) converges to zero. For illustration, $\alpha=0.9$.

In an operation 212, a seventh indicator may be received that indicates a value for a barrier reduction parameter $\rho$, where $\rho \in (0,1)$. In an alternative embodiment, the seventh indicator may not be received. For example, the value for the barrier reduction parameter $\rho$ may be stored, for example, in computer-readable medium 108 and used automatically. For illustration, $\rho=0.2$.

In an operation 214, an eighth indicator may be received that indicates a predefined integer value $\ell$, where $\ell \in \mathbb{N}$. In an alternative embodiment, the eighth indicator may not be received. For example, the predefined integer value $\ell$ may be stored, for example, in computer-readable medium 108 and used automatically. The predefined integer value is $\ell \geq 1$ and is used to define a number of last iterations used to satisfy a condition for a non-monotonic decrease of the complementarity slackness to update the barrier parameter p and the estimate of the Lagrange multipliers $\lambda$. For illustration, $\ell = 2$.

In an operation 216, a ninth indicator of a maximum number of iterations $I_{max}$ may be received. In an alternative embodiment, the ninth indicator may not be received. For example, a default value may be stored, for example, in computer-readable medium 108 and used automatically. In another alternative embodiment, the value of the maximum number of iterations $I_{max}$ may not be selectable. Instead, a fixed, predefined value may be used. For illustration, a default value of the maximum number of iterations $I_{max}$ may be 250 though other values may be used. The maximum number of iterations $I_{max}$ indicates how many iterations are performed as part of solving the optimization problem. In an alternative embodiment, a maximum computing time may be specified in addition to or instead of the maximum number of iterations $I_{max}$ and used in a similar manner to stop the optimization process when the maximum computing time is reached.

In an operation 220, a tenth indicator may be received that indicates a value for a first scaling parameter $\eta$, where $\eta \in (0,1)$. In an alternative embodiment, the tenth indicator may not be received. For example, the value for the first scaling parameter $\eta$ may be stored, for example, in computer-readable medium 108 and used automatically. For illustration, $\eta=10^{-4}$.

In an operation 222, an eleventh indicator may be received that indicates a value for a second scaling parameter $\nu$, where $\nu \geq 0$. In an alternative embodiment, the eleventh indicator may not be received. For example, the value for the second scaling parameter $\nu$ may be stored, for example, in computer-readable medium 108 and used automatically. For illustration, $\nu=10^{-4}$.

In an operation 224, a twelfth indicator may be received that indicates a value for whether the quadratic penalty is to be applied. For example, a quadratic penalty application may be set to zero or one, or alternatively, true or false, to indicate whether the quadratic penalty is to be applied. In an alternative embodiment, the twelfth indicator may not be received. For example, the quadratic penalty application may be stored, for example, in computer-readable medium 108 and used automatically. For illustration, the quadratic penalty application may be defined as one or true by default.

In an operation 226, a thirteenth indicator may be received that indicates a value for a feasibility parameter $\beta$, where $0 \leq \beta \leq 1$, when the quadratic penalty application is selected, for example, indicates true. In an alternative embodiment, the thirteenth indicator may not be received. For example, the value for feasibility parameter $\beta$ may be stored, for example, in computer-readable medium 108 and used automatically. For illustration, $\beta=0.9$. The feasibility parameter $\beta$ defines how close to the singularities the MLB function is extrapolated.

In an operation 228, an index $i_0$ and an index j are initialized, for example, as $i_0=0$ and j=0.

In an operation 230, an iteration index k is initialized, for example, as k=0.

In an operation 232, an optimality check is performed using a current solution $w_k=(x_k,z_k)$, where the current decision variable vector x and dual variable vector z are indicated by the iteration index k. For example, the optimality check is performed using $$\begin{pmatrix} \nabla f(x_k) - \nabla c(x_k) z_k \\ C(x_k) Z_k e \end{pmatrix} = \begin{pmatrix} 0 \\ 0 \end{pmatrix}$$

as defined above.

In operation 234, a determination is made concerning whether the current solution $w_k$ is an optimum solution based on the optimality check or whether $k \geq I_{max}$. When $w_k$ is an optimum solution or $k \geq I_{max}$, processing continues in an operation 236. When $w_k$ is not an optimum solution and $k < I_{max}$, processing continues in an operation 240 to perform another iteration.

In operation 236, the current solution vector $x_k$ is output as the optimized solution that includes a value for each decision variable $x_{k,i}$, i=1, ... n. For example, the current solution vector $x_k$ may be output to solution description 124 and/or to display 116. Additional information regarding the optimization process further may be output such as the current objective function value $f(x_k)$.

Referring to FIG. 2B, in operation 240, a value $\zeta_k$ is determined from a sequence that converges to zero. For illustration, $\zeta_k=10\mu_k$ to guarantee that a right hand-side of equation (3) converges to zero.

In an operation 242, a complementarity slackness test is performed using the current solution $w_k=(x_k,z_k)$. For example, the complementarity slackness test is performed using $\|C(x_k)z_k\| \leq \alpha \|C(x_{k-1})z_{k-1}\|$ or $\|C(x_k)z_k\| \leq \alpha \max\{\|C(x_{i_j})z_{i_j}\|:(k-\ell)^+\leq j\leq k\}+\zeta_k$ as described relative to equation (3) above.

In operation 244, a determination is made concerning whether $\|C(x_k)z_k\| \leq \alpha \max\{\|C(x_{i_j})z_{i_j}\|:(k-\ell)^+\leq j\leq k\}+\zeta_k$, which indicates that the Lagrange multipliers are updated. When $\|C(x_k)z_k\| \leq \alpha \max\{\|C(x_{i_j})z_{i_j}\|:(k-\ell^+)\leq j\leq k\}+\zeta_k$, processing continues in an operation 246. When $\|C(x_k)z_k\| > \alpha \max\{\|C(x_{i_j})z_{i_j}\|:(k-\ell^+)\leq j\leq k\}+\zeta_k$, processing continues in an operation 252 to instead update the barrier parameter.

In operation 246, the next barrier parameter value is defined or updated, for example, using $\mu_{k+1}=0.5\mu_k$ such that $\mu_{k+1} \leq \mu_k$. As another example, $\mu_{k+1}=q\mu_k$, where $0<q\leq 1$ and q may be defined by a user or using a default value. An illustrative value for q may be q=0.5 or q=0.2 though other values may be used.

In an operation 248, the next Lagrange multiplier values are defined or updated, for example, using $\lambda_{k+1,h}=z_{k,h}$, h=1, . . . , m.

In an operation 250, the index $i_k$ and the index j are updated, for example, using $i_{k+1}$=k and j=k, and processing continues in an operation 258.

In operation 252, the next barrier parameter value is defined or updated, for example, using $\mu_{k+1}=\rho\mu_k$.

In an operation 254, the next Lagrange multiplier values are defined or updated, for example, using $\lambda_{k+1,h}=\lambda_{k,h}$, h=1, . . . , m.

In an operation 256, the index $i_k$ and the index j are updated, for example, using $i_{k+1}=i_k$ and j=k, and processing continues in an operation 258.

In operation 258, a search direction vector d is computed as $$d_{k,h} = (d_{k,g}^{x_k,g}, d_{k,h}^{z_k,h}), g = 1, \ldots, n, h = 1, \ldots, m$$

for each next solution value by solving the primal-dual linear system $J(w_k,\mu_{k+1})d=-r(w_k,\lambda_{k+1},\mu_{k+1})$, where $$\|r(w_k, \lambda_{k+1}, \mu_{k+1})\| = \left\| \begin{pmatrix} \nabla_x \mathcal{L}(w_k) \\ Z_k C(x_k)e + \mu_{k+1}(z_k - \lambda_{k+1}) \end{pmatrix} \right\|,$$

$$J(w_k, \mu_{k+1}) = \begin{pmatrix} \nabla_x^2 \mathcal{L}(w_k) & -\nabla c(x_k) \\ Z_k \nabla c(x_k)^T & C(x_k) + \mu_{k+1} I \end{pmatrix}$$

and search direction vector d is computed using a regularized Newton method applied to the KKT conditions of the initial problem. For example, the linear system is solved by applying an LDL factorization as described in Chapter 4 of a book by Golub, G. H., and C. F. Van Loan, Matrix Computations, 3rd ed. (Johns Hopkins University Press 1996).

In an operation 260, step lengths are computed as $\alpha_{k,g}^{x_{k,g}}$, g=1, . . . , n and $\alpha_{k,h}^{z_{k,h}}$, h=1, . . . , m for each next solution value such that $$\frac{c(x_k + \alpha_k^x d_k^x)}{\mu_{k+1}} + 1 > 0 \text{ and } z_k + \alpha_k^z d_k^z > 0$$

as discussed above relative to equations (5) and (6). A fraction is applied to the boundary rule to compute $\alpha_k^x$ and $\alpha_k^z$ that satisfy equations (5) and (6). For illustration, $$\alpha_k^x := \max\left\{\alpha_k^x \in (0, 1] : \frac{c(x_k + \alpha_k^x d_k^x)}{\mu_{k+1}} + 1 \geq 0.005\left(\frac{c(x_k)}{\mu_{k+1}} + 1\right)\right\} \text{ and }$$

$$\alpha_k^z = \max\{\alpha_k^z \in (0, 1] : z_k + \alpha_k^z d_k^z \geq 0.005 z_k\}.$$

The constraints are first linearized to compute an initial estimate of a primal step length $\alpha_k^x$. For example, an initial estimate is computed using $$\alpha_k^x := \min\left\{1, -0.995 \min_{\{i:(\nabla c(x_k)^T d_k^x)_i < 0\}}\left\{\frac{c((x_k))_i + \mu_{k+1}}{(\nabla c(x_k)^T d_k^x)_i}\right\}\right\}.$$

If the initial estimate is not acceptable because $$\frac{c(x_k + \alpha_k^x d_k^x)}{\mu_{k+1}} + 1 < 0.005\left(\frac{c(x_k)}{\mu_{k+1}} + 1\right),$$

a backtracking method is applied to iterate to a solution for the primal step length $\alpha_k^x$ such that $$\frac{c(x_k + \alpha_k^x d_k^x)}{\mu_{k+1}} + 1 \geq 0.005\left(\frac{c(x_k)}{\mu_{k+1}} + 1\right).$$

For the dual step length $\alpha_k^z$, a unit step length is tried as an initial estimate of the dual step length $\alpha_k^z=1$. If the initial estimate of the dual step length $\alpha_k^z$ is not acceptable because $z_k+\alpha_k^z d_k^z < 0.005 z_k$, a backtracking method is applied to iterate to a solution for the dual step length $\alpha_k^z$ such that $z_k+\alpha_k^z d_k^z \geq 0.005 z_k$.

In an operation 262, a next solution $\hat{w}_k=(\hat{x}_k,\hat{z}_k)$ is determined using $\hat{x}_k=x_{k,g}+\alpha_{k,g}^{x_{k,g}}d_{k,g}^{x_{k,g}}$ for g=1, . . . , n and $\hat{z}_k=z_{k,h}+\alpha_{k,h}^{x_{k,h}}d_{k,h}^{x_{k,h}}$ for h=1, . . . , m.

In an operation 264, a value $\varepsilon_k$ is determined, for example, using $\varepsilon_k=0.9 \max\{\|r(w_j,\lambda_j,\mu_j)\|:(k-4)^+ \leq j \leq k\}+10\mu_{k+1}$, where $$\|r(w_j, \lambda_j, \mu_j)\| = \left\| \begin{pmatrix} \nabla_x \mathcal{L}(w_j) \\ \hat{Z}_j C(x_j)e + \mu_j(z_j - \lambda_j) \end{pmatrix} \right\|.$$

A maximum of the norm of the vector $\|(w_j,z_j,\mu_j)\|$ over a last five iterations (iterations k, k−1, k−2, k−3, k−4) is chosen where $r(w_j,\lambda_j,\mu_j)$ was already computed and stored above.

In an operation 266, an iteration check is performed using the next solution $\hat{w}_k=(\hat{x}_k,\hat{z}_k)$, and processing continues in operation 268. For example, the iteration check is performed using $\|r(\hat{w}_k, \lambda_{k+1}, \mu_{k+1})\| \leq \varepsilon_k$ as described relative to equation (4) above, where $$\|r(\hat{w}_k, \lambda_{k+1}, \mu_{k+1})\| = \left\| \begin{pmatrix} \nabla_x \mathcal{L}(\hat{w}_k) \\ \hat{Z}_k C(\hat{x}_k)e + \mu_{k+1}(\hat{z}_k - \lambda_{k+1}) \end{pmatrix} \right\|.$$

Referring to FIG. 2C, in operation 268, a determination is made concerning whether $\|r(\hat{w}_k, \lambda_{k+1}, \mu_{k+1})\| \leq \varepsilon_k$, which indicates whether inner iterations are needed. When $\|r(\hat{w}_k, \lambda_{k+1}, \mu_{k+1})\| \leq \varepsilon_k$, processing continues in an operation 270 because the inner iterations are not needed. When $\|r(\hat{w}_k, \lambda_{k+1}, \mu_{k+1})\| > \varepsilon_k$, processing continues in an operation 274 to perform the inner iterations.

In operation 270, the next solution is updated using index $w_{k+1}=\hat{w}_k$.

In an operation 272, the iteration index k is incremented, for example, using k=k+1, and processing continues in operation 232 to determine if $w_{K+1}$ is the optimal solution.

In operation 274, an inner iteration index h is initialized using h=0, $w_{k,h}=\hat{w}_k$, $\lambda=\lambda_{k+1}$, and $\mu=\mu_{k+1}$.

Similar to operation 258, in an operation 276, a search direction vector d is computed as d=(d$^{x_k}$,d$^{z_k}$) for each next solution value by solving J(w$_{k,h}$,µ)d=−r(w$_{k,h}$, λ, µ) as discussed above.

In an operation 278, α is defined using $\bar{\alpha}$=1.

Figure 3:
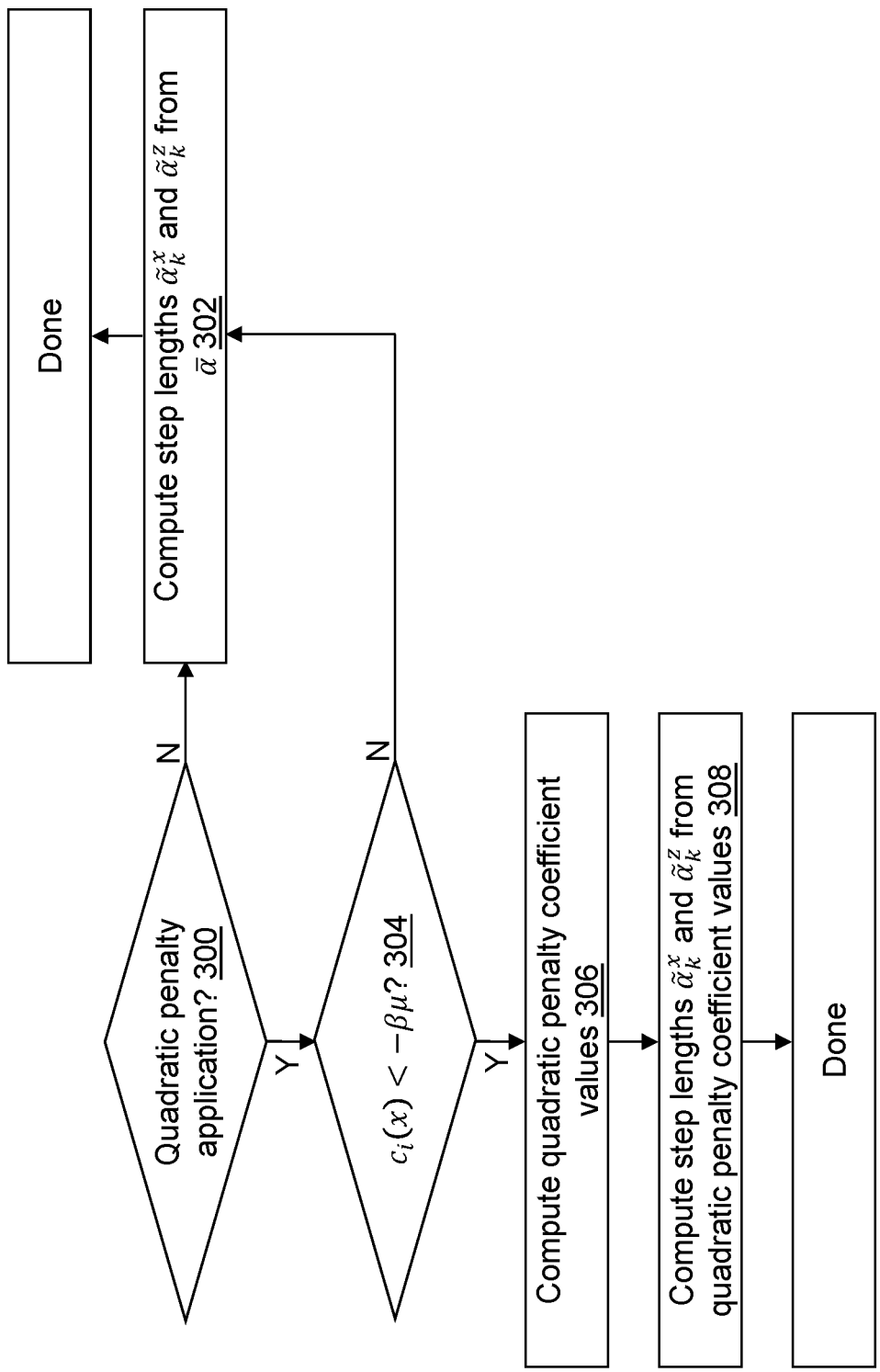
FIG. 3 depicts a flow diagram illustrating examples of operations performed by the nonlinear optimization application of the nonlinear optimization device of FIG. 1 in applying a quadratic penalty in accordance with an illustrative embodiment.

In an operation 280, step lengths are computed based on the value of the quadratic penalty application. For example, referring to FIG. 3, the step lengths are computed based on the value of the quadratic penalty application.

In an operation 300, a determination is made concerning the value of the quadratic penalty application. When the quadratic penalty application is zero or false, processing continues in an operation 302. When the quadratic penalty application is one or true, processing continues in an operation 304.

Similar to operation 260, in operation 302, step lengths are computed as $\tilde{\alpha}_{k,h}^{w_{k,h}} \in (0, \bar{\alpha}$do it9 for each next solution value such that $$\frac{c(x_{k,h} + \tilde{\alpha}_{k,h}^{x_{k,h}} d^{x_{k,h}})}{\mu} + 1 > 0 \text{ and } z_{k,h} + \tilde{\alpha}_{k,h}^{z_{k,h}} d^{z_{k,h}} > 0$$

as discussed above relative to equations (5) and (6) and processing is done for the quadratic penalty application and continues in an operation 282. A fraction is again applied to the boundary rule to compute $\tilde{\alpha}_k^x$ and $\tilde{\alpha}_k^z$ that satisfy equations (5) and (6). For illustration, $$\tilde{\alpha}_k^x := \max\left\{\alpha_k^x \in (0, 1] : \frac{c(x_k + \alpha_k^x d_k^x)}{\mu_k} + 1 \geq 0.005\left(\frac{c(x_k)}{\mu_k} + 1\right)\right\} \text{ and }$$

$$\tilde{\alpha}_k^z = \max\{\alpha_k^z \in (0, 1] : z_k + \alpha_k^z d_k^z \geq 0.005 z_k\}.$$

In operation 304, a determination is made concerning whether c$_i$(x$_{k,h}$)<−βµ. When c$_i$(x$_{k,h}$)<−βµ, processing continues in an operation 306. When c$_i$(x$_{k,h}$)≥−βµ, processing continues in operation 302.

In operation 306, quadratic penalty coefficient values are computed, for example, using coefficients q$^a$, q$^b$, q$^c$ defined by $$q^a = \frac{-1}{(\mu(1-\beta))^2}, q^b = \frac{1-\beta}{\mu(1-\beta)^2}, \text{ and } q^c = \frac{\beta(2-3\beta)}{2(1-\beta)^2} + \log(1-\beta).$$

In an operation 308, step lengths are computed as $\tilde{\alpha}_{k,h}^{w_k,h} \in (0,\bar{\alpha}]$ for each next solution value such that $$\frac{1}{2}q^a\left(c_i(x_{k,h} + \tilde{\alpha}_{k,h}^{x_{k,h}} d^{x_{k,h}})\right)^2 +$$
$$q^b c_i(x_{k,h} + \tilde{\alpha}_{k,h}^{x_{k,h}} d^{x_{k,h}}) + q^c > 0 \text{ and } z_{k,h} + \tilde{\alpha}_{k,h}^{z_{k,h}} d^{z_{k,h}} > 0,$$

and processing is done for the quadratic penalty application and continues in operation 282.

$$\tilde{\alpha}_{k,h}^{x_{k,h}} = 1, \text{ and}$$
$$\frac{1}{2}q^a\left(c_i(x_{k,h} + \tilde{\alpha}_{k,h}^{x_{k,h}} d^{x_{k,h}})\right)^2 + q^b c_i(x_{k,h} + \tilde{\alpha}_{k,h}^{x_{k,h}} d^{x_{k,h}}) + q^c > 0$$

is applied to make sure that the dual variable z remains positive. Once the dual step length $\tilde{\alpha}_{k,h}^{z_{k,h}}$ is computed, $\alpha_{k,h}^{w_{k,h}} = \min(\tilde{\alpha}_{k,h}^{x_{k,h}}, \tilde{\alpha}_{k,h}^{z_{k,h}})$.

Referring again to FIG. 2C, in operation 282, step lengths are computed as $\alpha_{k,h}^{w_{k,h}} \in (0, \tilde{\alpha}_{k,h}^{w_{k,h}}]$ for each next solution value such that the Armijo condition is satisfied based on $$\Phi_{\lambda,\mu}(w_{k,h} + \alpha_{k,h}^{w_{k,h}} d^{w_{k,h}}) \leq \Phi_{\lambda,\mu}(w_{k,h}) + \alpha_{k,h}^{w_{k,h}} \eta \nabla \Phi_{\lambda,\mu}(w_{k,h})^\top d^{w_{k,h}}, \text{ where}$$

$$\Phi(w) = M(x) + \nu\mu \sum_{i \in \mathcal{B}} \left(\frac{(c_i(x) + \mu)z_i}{\mu\lambda_i} - \log\left(\frac{(c_i(x) + \mu)z_i}{\mu\lambda_i}\right)\right).$$

In an operation 284, a determination is made concerning whether another backtracking step is needed. When another backtracking step is needed, $$\frac{c(x_{k,h} + \alpha_{k,h}^{x_{k,h}} d^{x_{k,h}})}{\mu} + 1 \leq 0 \text{ or } z_{k,h} + \alpha_{k,h}^{z_{k,h}} d^{z_{k,h}} \leq 0.$$

When another backtracking step is not needed, $$\frac{c(x_{k,h} + \alpha_{k,h}^{x_{k,h}} d^{x_{k,h}})}{\mu} + 1 > 0 \text{ and } z_{k,h} + V_{k,h}^{z_{k,h}} d^{z_{k,h}} > 0.$$

When another backtracking step is needed, processing continues in an operation 286. When another backtracking step is not needed, processing continues in an operation 288.

In operation 286, $\bar{\alpha}=\alpha$, and processing continues in operation 278.

In operation 288, $\alpha_{k,h}=\alpha$ for each next solution value.

In an operation 290, a next solution w$_{k,h+1}$=(x$_{k,h}$,z$_{k,h}$) is determined using w$_{k,h+1}$=w$_{k,h}$+α$_{k,h}$d$^{w_{k,h}}$.

In an operation 292, a determination is made concerning whether ||r(w$_{k,h+1}$,λ, µ)||≥ε$_k$. When ||r(w$_{k,h+1}$,λ, µ)||≤ε$_k$, processing continues in an operation 296 because additional inner iterations are not needed. When ||r(w$_{k,h+1}$,λ, µ)||>ε$_k$, processing continues in an operation 294 to perform additional inner iterations.

In operation 294, the inner iteration index h is incremented, for example, using h=h+1, and processing continues in operation 276 to perform another inner iteration.

In operation 296, the next solution is updated using index w$_{k+1}$=w$_{k,h+1}$.

In an operation 298, the iteration index k is incremented, for example, using k=k+1, and processing continues in operation 232 to determine if w$_{k+1}$ is the optimal solution.

Nonlinear optimization application 122 was developed and executed in the C programming language without quadratic penalty application (indicated as 122) and with quadratic penalty application (indicated as 122 with Q). The models were written using the OPTMODEL Procedure developed and provided by SAS Institute Inc. of Cary, N.C., USA as part of SAS OR®. The numerical solutions were obtained using a 64-bit 2.50 gigahertz Intel® Xeon® CPU E7-4880 machine with 8 processors and 128 GB RAM.

A first set of problems includes two problems that naturally arise in astrophysics, engineering, and biology. The Lane-Emden problem is defined as Δu+u$^3$=0. The variational problem associated with this problem is $$g_{LE}(u) = \int_D \left(\frac{1}{2}|\nabla u(s)|^2 - \frac{1}{4}u(s)^4\right)ds,$$

where D is a unit square. The singularly perturbed Dirichlet problem defined as $\varepsilon^2 \Delta u + u^3 - u = 0$. The variational problem associated with this problem is $$g_D(u) = \int_D \left(\frac{\varepsilon^2}{2}|\nabla u(s)|^2 + \frac{1}{2}u(s)^2 - \frac{1}{4}u(s)^4\right)ds,$$

where D is a unit circle. A solution for the Lane-Emden and Dirichlet problems can be obtained by discretizing the corresponding variational problems using difference approximations based on a triangularization of the corresponding domain D. Using this, an approximate solution of the two problems is found by solving the following inequality optimization problem:

Minimize w, subject to $g(u_k) \leq h$, $1 \leq k \leq m$ and $|u_k - u_{k+1}| \leq h$, $0 \leq k \leq m$, where $h > 0$ is a fixed tolerance, and m is a number of breakpoints used by an elastic string algorithm. Note that for the first set of inequality constraints, the function g is replaced with $g_{LE}$ or $g_D$. For each problem, the results were computed using m=10 and m=40.

Table 1 below summarizes the performance comparison between nonlinear optimization application 122 without quadratic penalty application and with quadratic penalty application in terms of computing time on the first set of problems with m=10 (_10) and m=40 (_40).

TABLE 1

| Problem | 122 | 122 with Q |
|---|---|---|
| Lane_Emden_10 | 2.75 | 1.06 |
| Lane_Emden_40 | 77.86 | 13.17 |
| Dirichlet_10 | 1.01 | 0.51 |
| Dirichlet_40 | 4.2 | 10.61 |

The results show that nonlinear optimization application 122 with quadratic penalty application provides an improved efficiency relative to nonlinear optimization application 122 without quadratic penalty application. This improvement results based on the number of function evaluations required. For the first set of problems, the number of function evaluations required by nonlinear optimization application 122 with quadratic penalty application was much less than that required by nonlinear optimization application 122 without quadratic penalty application because nonlinear optimization application 122 without quadratic penalty application has to perform backtracking to satisfy the inequality $$\frac{c(x_k + \alpha_k^x d_k^x)}{\mu_{k+1}} + 1 > 0;$$

whereas, when the inequality $$\frac{c(x_k + \alpha_k^x d_k^x)}{\mu_{k+1}} + 1 > 0$$

is not satisfied using nonlinear optimization application 122 with quadratic penalty application, the quadratic term is used instead. As a result, there is no backtracking required, and a unit step-length could be chosen.

A primal-dual CLB method was also developed and executed in the C programming language, for example, based on methods described in a paper by Silva, R. et al., *Local analysis of the feasible primal-dual interior-point method*, Computational Optimization and Applications, Volume 40, Issue 1, pp. 41-57 (May 2008). Again, the model was written using the OPTMODEL Procedure. Using the primal-dual CLB method, a strictly feasible initial point was assumed with respect to the inequality constraint. The computation time results are summarized in Table 2 below.

TABLE 2

| Problem | CLB method | 122 with Q |
|---|---|---|
| Lane_Emden_10 | 89.33 | 1.06 |
| Lane_Emden_40 | 591.25 | 13.17 |
| Dirichlet_10 | 5.22 | 0.51 |
| Dirichlet_40 | 33.87 | 10.61 |

Table 2 confirms the superiority of nonlinear optimization application 122 with quadratic penalty application over the classical primal-dual CLB method. Again, the improvement results based on the number of function evaluations required. For example, for the problem Lane_Emden_10, the primal-dual CLB method required 32,761 function evaluations while nonlinear optimization application 122 with quadratic penalty application only required 24, which had a significant impact on the computing time that made nonlinear optimization application 122 with quadratic penalty application 84 times faster when solving problem Lane_Emden_10.

A first general-purpose nonlinear optimization solver described in a paper by A. Wachter and L. T. Biegler, *On the implementation of an interior-point filter line-search algorithm for large-scale nonlinear programming*, Mathematical Programming, Volume 106, Issue 1, Series A, pp. 25-57 (Mar. 2006) (GPNO1) was developed and executed in the C programming language. A second general-purpose nonlinear optimization solver described in a paper by P. Armand and R. Omheni, *A globally and quadraticaiiy convergent primal-dual augmented iagrangian algorithm for equality constrained optimization*, Optimization Methods and Software, Volume 32, Issue 1, pp. 1-21 (2017) (GPNO2) was developed and executed in the C programming language. Again, the models were written using the OPTMODEL Procedure. Both GPNO1 and GPNO2 are well-established nonlinear optimization problem solvers. Both GPNO1 and GPNO2 convert the inequality constraints to equality constraints using slack variables. GPNO1 is understood to be the best open-source general-purpose nonlinear optimization solver. GPNO2 applies a primal-dual augmented Lagrangian interior-point algorithm while GPNO1 implements a line-search filter method. Both GPNO1 and GPNO2 were run using their default options except for the scaling procedure. All executions were done without scaling to have a similar execution stop condition.

The performance was compared using a class of degenerate problems created by manipulating the OPTMODEL models and adding the constraint $-c_1(x)^2 \leq 0$. As a result, the problems are appended with "_d" to indicate this addition. This transformation does not have any impact on the feasible region but makes every problem degenerate since the Mangasarian-Fromovitz Constraint Qualification is not satisfied at all solution points. This transformation makes the problem harder to solve. The computation time results are summarized in Table 3 below.

TABLE 3

| Problem | GPNO1 | GPNO2 | 122 with Q |
|---|---|---|---|
| Lane_Emden_10_d | 9.02 | 190.76 | 2.71 |
| Lane_Emden_40_d | 48.27 | 76.28 | 26.93 |
| Dirichlet_10_d | 10.92 | 24.66 | 8.32 |
| Dirichlet_40_d | 1949.69 | 266.99 | 13.74 |

For the four different problems, nonlinear optimization application 122 with quadratic penalty application clearly outperformed GPNO1 and GPNO1 in terms of computation time. Using nonlinear optimization application 122 with quadratic penalty application provides the improvement by extrapolating the modified logarithmic term with quadratic approximations.

A second set of computational experiments explores the behavior when solving a product portfolio problem that arises in industry. The goal of this problem is to define a portfolio strategy for a laundry powder business. More precisely, the portfolio variables (additive levels, intermediate compositions, intermediate levels, intermediate assignments) that minimize a total cost are determined. Each product uses one intermediate composition and a plurality of additive compositions.

The problem can be reformulated as a nonlinear optimization with equality and inequality constraints. The objective function consists of minimizing the portfolio cost, including raw material and some manufacturing and shipment costs across all products. Equality constraints are added to make sure that a sum of a product ingredient fractions is equal to one. The inequality constraints are added to ensure that product quality predictions and product composition variables remain within specified ranges. Two sets of data were used as summarized in Table 4 below.

TABLE 4

|  | Number of ingredients | Number of premixes | Number of variables | Linear Constraints | Nonlinear Constraints |
|---|---|---|---|---|---|
| Dataset 1 | 47 | 53 | 266 | 4 | 1474 |
| Dataset 2 | 49 | 52 | 872 | 12 | 7911 |

The computation time results are summarized in Table 5 below.

TABLE 5

| Problem | GPNO1 | 122 | 122 with Q |
|---|---|---|---|
| Dataset 1 | 81 | 187 | 79 |
| Dataset 2 | 210 | 377 | 194 |

From the results presented in Table 5, nonlinear optimization application 122 with quadratic penalty application is faster than nonlinear optimization application 122 without quadratic penalty application. For both datasets, nonlinear optimization application 122 with quadratic extrapolation is over twice as fast as nonlinear optimization application 122 without quadratic penalty application. Table 4 also shows that nonlinear optimization application 122 with quadratic extrapolation is faster in comparison to the nonlinear optimization problem solver GPNO1.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   (A) perform an optimality check for a current solution to a predefined objective function, wherein the predefined objective function is a nonlinear equation with a plurality of decision variables;
   (B) when the performed optimality check indicates that the current solution is an optimal solution, output the optimal solution to the predefined objective function, wherein the optimal solution includes a value for each decision variable of the plurality of decision variables that optimizes a result of the predefined objective function;
   when the performed optimality check indicates that the current solution is not the optimal solution,
   (C) perform a complementarity slackness test with the current solution;
   (D) based on the result of the performed complementarity slackness test, update a barrier parameter value and update a Lagrange multiplier value for each constraint function of a plurality of constraint functions defined for objective function optimization, wherein each constraint function applies one or more of the plurality of decision variables;
   (E) determine a search direction vector by solving a primal-dual linear system that includes a dual variable defined for each constraint function of the plurality of constraint functions, wherein the search direction vector includes a direction value for each decision variable of the plurality of decision variables and for each dual variable of a plurality of dual variables, wherein the search direction vector is determined based on the updated barrier parameter value and the updated Lagrange multiplier value for each constraint function of the plurality of constraint functions;
(F) determine a step length value for each decision variable of the plurality of decision variables and for each dual variable of the plurality of dual variables based on the updated barrier parameter value;
(G) update the current solution to the predefined objective function using the determined search direction vector and the determined step length value for each decision variable of the plurality of decision variables and for each dual variable of the plurality of dual variables; and
(H) perform an iteration check for the updated current solution;
when the performed iteration check indicates that a second set of iterations is needed,
(I) determine a second search direction vector by solving the primal-dual linear system using the updated current solution, the updated barrier parameter value, and the updated Lagrange multiplier value for each constraint function of the plurality of constraint functions, wherein the second search direction vector includes the direction value for each decision variable of the plurality of decision variables and for each dual variable of the plurality of dual variables;
(J) determine a second step length value for each decision variable of the plurality of decision variables and for each dual variable of the plurality of dual variables based on the updated barrier parameter value, wherein the second step length value is determined for each decision variable of the plurality of decision variables and each dual variable of the plurality of dual variables using quadratic coefficient values;
(K) determine a third step length value for each decision variable of the plurality of decision variables and for each dual variable of the plurality of dual variables based on the updated current solution, the updated barrier parameter value, and the determined second step length value by minimizing a primal-dual merit function;
(L) update the current solution to the predefined objective function using the determined second search direction vector and the determined third step length value for each decision variable of the plurality of decision variables and for each dual variable of the plurality of dual variables; and
(M) repeat (H) to (L) until the performed iteration check indicates that the second set of iterations is complete; and
(N) repeat (A) to (M) until the performed optimality check indicates that the current solution is the optimal solution or a predefined number of iterations of (D) has been performed.

2. The non-transitory computer-readable medium of claim 1, wherein, before a first iteration of (A), the current solution is initialized to a predefined solution starting point that includes values for each decision variable of the plurality of decision variables and for each dual variable of the plurality of dual variables.

3. The non-transitory computer-readable medium of claim 1, wherein, before a first iteration of (A), the barrier parameter value is initialized to a predefined barrier parameter value.

4. The non-transitory computer-readable medium of claim 1, wherein, before a first iteration of (A), the Lagrange multiplier value for each constraint function of the plurality of constraint functions is initialized to a predefined Lagrange multiplier value for each constraint function of the plurality of constraint functions.

5. The non-transitory computer-readable medium of claim 1, wherein the optimality check is performed using $$\begin{pmatrix} \nabla f(x) - \nabla c(x)z \\ C(x)Ze \end{pmatrix} = \begin{pmatrix} 0 \\ 0 \end{pmatrix}, c(x) \geq 0 \text{ and } z \geq 0,$$

where $\nabla f(x)$ indicates a gradient of the predefined objective function, x indicates values for the plurality of decision variables, c(x) indicates the plurality of constraint functions solved with x, $\nabla c(x)$ indicates a gradient for each of the plurality of constraint functions, z indicates values for each dual variable of the plurality of dual variables, C(x) indicates a first diagonal matrix whose diagonal entries are defined by components of c(x), Z is a second diagonal matrix whose diagonal entries are defined by components of $z_i$, and e indicates a vector of all ones.

6. The non-transitory computer-readable medium of claim 5, wherein $$z_i = \frac{\mu \lambda_i}{c_i(x) + \mu},$$

i=1, ..., m, where $z_i$ indicates a value for an $i^{th}$ dual variable, u indicates the barrier parameter value, $\lambda_i$ indicates an $i^{th}$ Lagrange multiplier value, $c_i(x)$ indicates an $i^{th}$ constraint function of the plurality of constraint functions, and m is a number of the plurality of constraint functions solved with x.

7. The non-transitory computer-readable medium of claim 1, wherein the complementarity slackness test is performed using $\|C(x_k)z_k\| \leq \alpha \|C(x_{k-1})z_{k-1}\|$, where k is a value of a number of iterations of (C), $x_k$ indicates a $k^{th}$ plurality of decision variables, $z_k$ indicates a $k^{th}$ plurality of dual variables, $C(x_k)$ indicates a first diagonal matrix whose diagonal entries are defined by components of $c(x_k)$, $c(x_k)$ indicates the plurality of constraint functions solved with $x_k$, a indicates a predefined convergence parameter value, $x_{k-1}$ indicates a $(k-1)^{th}$ plurality of decision variables, $C(x_{k-1})$ indicates a first diagonal matrix whose diagonal entries are defined by components of $c(x_{k-1})$, $c(x_{k-1})$ indicates the plurality of constraint functions solved with $x_{k-x}$, and $\|\ \|$ indicates a Euclidean norm.

8. The non-transitory computer-readable medium of claim 1, wherein the complementarity slackness test is performed using $\|C(x_k)z_k\| \leq \alpha \max \{\|C(x_{i_j})z_{i_j}\|:(k-\ell^+ \leq j \leq k\} + \zeta_k$, where k is a value of a number of iterations of (C), $x_k$ indicates a $k^{th}$ plurality of decision variables, $z_k$ indicates a $k^{th}$ plurality of dual variables, $C(x_k)$ indicates a first diagonal matrix whose diagonal entries are defined by components of $c(x_k)$, $c(x_k)$ indicates the plurality of constraint functions solved with $x_k$, a indicates a predefined convergence parameter value, $\|\ \|$ indicates a Euclidean norm, j indicates a first index value defined in (D) based on the result of the performed complementarity slackness test, $i_j$ indicates a second index value defined in (D) based on the result of the performed complementarity slackness test, $x_{i_j}$ indicates an $i_j^{th}$ plurality of decision variables, $C(x_{i_j})$ indicates the first diagonal matrix whose diagonal entries are defined by components of $c(x_{i_j})$, $c(x_{i_j})$ indicates the plurality of constraint functions solved with $x_{i_j}$, $z_{i_j}$ indicates an $i_j^{th}$ plurality of dual variables, $\ell$ is a predefined integer, $t^+ = \max\{t,0\}$, and $\{\zeta_k\}$ is a first sequence of values that converge to zero.

9. The non-transitory computer-readable medium of claim 8, wherein when $\|C(x_k)z_k\| \leq \alpha \max\{\|C(x_{i_j})z_{i_j}\|:(k-\ell)^+ \leq j \leq k\} + \zeta_k$, the updated barrier parameter value is updated using $\mu_{k+1} = q\mu_k$, where $\mu_k$ indicates a current barrier parameter value, $\mu_{k+1}$ indicates the updated barrier parameter value, q is a predefined multiplier, and the Lagrange multiplier value for each constraint function is updated using $\lambda_{k+1,h} = z_{k,h}$, $h=1, \ldots, m$, where $\lambda_{k,h}$ indicates a current $h^{th}$ Lagrange multiplier value, $\lambda_{k+1,h}$ indicates the updated $h^{th}$ Lagrange multiplier value, and m is a number of the plurality of constraint functions.

10. The non-transitory computer-readable medium of claim 9, wherein when $\|C(x_k)z_k\| \leq \alpha \max\{\|C(x_{i_j})z_{i_j}\|: (k-\ell)^+ \leq j \leq k\} + \zeta_k$, $i_{k+1} = k$, and $j = k$.

11. The non-transitory computer-readable medium of claim 8, wherein when $\|C(x_k)z_k\| > \alpha \max\{\|C(x_{i_j})z_{i_j}\|: (k-\ell)^+ \leq j \leq k\} + \zeta_k$, the updated barrier parameter value is updated $\mu_{k+1} = \rho\mu_k$, where $\mu_k$ indicates a current barrier parameter value, $\mu_{k+1}$ indicates the updated barrier parameter value, and $\rho$ indicates a predefined value, and the Lagrange multiplier value for each constraint function is updated using $\lambda_{k+1,h} = \lambda_{k,h}$, $h=1, \ldots, m$, where $\lambda_{k,h}$ indicates a current $h^{th}$ Lagrange multiplier value, $\lambda_{k+1,h}$ indicates the updated $h^{th}$ Lagrange multiplier value, and m is a number of the plurality of constraint functions.

12. The non-transitory computer-readable medium of claim 11, wherein $0 < \rho < 1$.

13. The non-transitory computer-readable medium of claim 11, wherein when $\|C(x_k)z_k\| > \alpha \max\{\|C(x_{i_j})z_{i_j}\|: (k-\ell)^+ \leq j \leq k\} + \zeta_k$, $i_{k+1} = i_k$, and $j = k$.

14. The non-transitory computer-readable medium of claim 8, wherein when $\|C(x_k)z_k\| \leq \alpha \max\{\|C(x_{i_j})z_{i_j}\|: (k-\ell)^+ \leq j \leq k\} + \zeta_k$, the barrier parameter value is reduced, and the updated Lagrange multiplier value for each constraint function of the plurality of constraint functions is unchanged.

15. The non-transitory computer-readable medium of claim 8, wherein, when the performed optimality check indicates that the current solution is not the optimal solution, before the $k^{th}$ iteration of (C), the computer-readable instructions further cause the computing device to update $\zeta_{k+1}$ using $\zeta_{k+1} = 10\mu_k$, where $\mu_k$ indicates the barrier parameter value before the $k^{th}$ iteration of (C).

16. The non-transitory computer-readable medium of claim 1, wherein the current solution to the predefined objective function is updated using $\hat{x}_k = x_{k,h} + \alpha_{k,h}^{x_{k,h}} d_{k,h}^{x_{k,h}}$ and $\hat{z}_k = z_{k,h} + \alpha_{k,h}^{z_{k,h}} d_{k,h}^{z_{k,h}}$ for $h=1, \ldots, n$, where k indicates a value of a number of iterations of (C), $\hat{x}_k$ indicates an updated solution for each decision variable of the plurality of decision variables, $\hat{z}_k$ indicates an updated solution for each dual variable of the plurality of dual variables, $x_{k,h}$ indicates an $h^{th}$ decision variable value of a $k^{th}$ plurality of decision variables, $\alpha_{k,h}^{x_{k,h}}$ indicates the determined step length value for $x_{k,h}$, $d_{k,h}^{x_{k,h}}$ indicates the determined search direction vector for $x_{k,h}$, $z_{k,h}$ indicates an $h^{th}$ dual variable value of a $k^{th}$ plurality of dual variables, $\alpha_{k,h}^{z_{k,h}}$ indicates the determined step length value for $z_{k,h}$, $d_{k,h}^{z_{k,h}}$ indicates the determined search direction vector for $z_{k,h}$, and n is a number of the one or more decision variables.

17. The non-transitory computer-readable medium of claim 1, wherein the primal-dual linear system is defined by $$\begin{pmatrix} \nabla_x^2 \mathcal{L}(w_k) & -\nabla c(x_k) \\ Z_k \nabla c(x_k)^\top & C(x_k) + \mu_{k+1} I \end{pmatrix} \begin{pmatrix} d_x \\ d_z \end{pmatrix} = -\begin{pmatrix} \nabla_x \mathcal{L}(w_k) \\ Z_k C(x_k) e + \mu_{k+1}(z_k - \lambda_{k+1}) \end{pmatrix},$$

where $\nabla_x^2$ indicates a second order derivative with respect to x, $\mathcal{L}$ indicates a Lagrange function, $\nabla$ indicates a first order derivative, $\nabla_x$ indicates a first order derivative with respect to x, $d_x$ indicates a derivative with respect to x, $d_z$ indicates a derivative with respect to z, k is a counter of iterations of (C), $x_k$ indicates a $k^{th}$ plurality of decision variables, $z_k$ indicates a $k^{th}$ plurality of dual variables, $w_k = (x_k, z_k)$, $C(x_k)$ indicates a first diagonal matrix whose diagonal entries are defined by components of $c(x_k)$, $c(x_k)$ indicates the plurality of constraint functions solved with $x_k$, $Z_k$ indicates a second diagonal matrix whose diagonal entries are defined by components of $z_k$, T indicates a transpose, $\mu_{k+1}$ indicates the updated barrier parameter value, $\lambda_{k+1}$ indicates the updated Lagrange multiplier value for each constraint function of the plurality of constraint functions, U indicates an identity matrix, and e indicates a vector of all ones.

18. The non-transitory computer-readable medium of claim 1, wherein the step length value is determined for each decision variable of the plurality of decision variables using a backtracking method applied to iterate to a solution such that $$\frac{c(x_k + \alpha_k^x d_k^x)}{\mu_{k+1}} + 1 \geq 0.005\left(\frac{c(x_k)}{\mu_{k+1}} + 1\right),$$

where k is a counter of iterations of (C), $x_k$ indicates a $k^{th}$ plurality of decision variables, $\alpha_k^x$ indicates a $k^{th}$ step length value for the $k^{th}$ plurality of decision variables, $d_k^x$ indicates a $k^{th}$ direction vector for the $k^{th}$ plurality of decision variables, $c(x_k + \alpha_k^x d_k^x)$ indicates the plurality of constraint functions solved with $x_k + \alpha_k^x d_k^x$, $\mu_{k+1}$ indicates the updated barrier parameter value, and $c(x_k)$ indicates the plurality of constraint functions solved with $x_k$.

19. The non-transitory computer-readable medium of claim 1, wherein the step length value is determined for each dual variable of the plurality of dual variables using a backtracking method applied to iterate to a solution such that $z_k + \alpha_k^z d_k^z \geq 0.005 z_k$, where k is a counter of iterations of (C), $z_k$ indicates a $k^{th}$ plurality of dual variables, $\alpha_k^z$ indicates a $k^{th}$ step length value for the $k^{th}$ plurality of dual variables, and $d_k^z$ indicates a $k^{th}$ direction vector for the $k^{th}$ plurality of dual variables.

20. The non-transitory computer-readable medium of claim 1, wherein the primal-dual merit function is $$\Phi(w) = f(x) - \mu \sum_{i \in \mathcal{I}} \lambda_i \log\left(\frac{c_i(x)}{\mu} + 1\right) + \nu\mu \sum_{i \in \mathcal{B}} \left(\frac{(c_i(x) + \mu)z_i}{\mu\lambda_i} - \log\left(\frac{(c_i(x) + \mu)z_i}{\mu\lambda_i}\right)\right),$$

where $\Phi(w)$ indicates the primal-dual merit function, $f(x)$ indicates the predefined objective function, $\mu$ indicates the updated barrier parameter value, $\lambda_i$ indicates an $i^{th}$ LaGrange multiplier, $c_i(x)$ indicates an $i^{th}$ constraint function solved with x, x indicates the plurality of decision variables, $\nu$ indicates a predefined scaling parameter value, and indicates an $i^{th}$ dual variable.

21. The non-transitory computer-readable medium of claim 1, wherein the third step length value is determined for each dual variable of the plurality of dual variables using a backtracking method applied to iterate to a solution that minimizes the primal-dual merit function.

22. The non-transitory computer-readable medium of claim 1, wherein the quadratic coefficient values are computed using $$q^a = \frac{-1}{(\mu(1-\beta))^2}, q^b = \frac{1-\beta}{\mu(1-\beta)^2},$$

$$\text{and } q^c = \frac{\beta(2-3\beta)}{2(1-\beta)^2} + \log(1-\beta),$$

where $\mu$ indicates the updated barrier parameter value, and $\beta$ indicates a predefined feasibility parameter value.

23. The non-transitory computer-readable medium of claim 22, wherein the second step length value is determined for each decision variable of the plurality of decision variables using a backtracking method applied to iterate to a solution such that $$\frac{1}{2}q^a(c_i(x_k + \tilde{\alpha}_k^{x_k} d^{x_k}))^2 + q^b c_i(x_k + \tilde{\alpha}_k^{x_k} d^{x_k}) + q^c > 0,$$

where k is a counter of iterations of (C), $x_k$ indicates a $k^{th}$ plurality of decision variables, $\tilde{\alpha}_k^{x_k}$ indicates a $k^{th}$ step length value for the $k^{th}$ plurality of decision variables, $d_k^x$ indicates a $k^{th}$ direction vector for the $k^{th}$ plurality of decision variables, $c(x_k+\alpha_k^x d_k^x)$ indicates the plurality of constraint functions solved with $x_k+\alpha_k^x d_k^x$, $\mu_{k+1}$ indicates the updated barrier parameter value, and $c_i(x_k+\tilde{\alpha}_k^{x_k} d^{x_k})$ indicates an $i^{th}$ constraint function solved with $x_k+\tilde{\alpha}_k^{x_k} d^{x_k}$.

24. The non-transitory computer-readable medium of claim 22, if wherein the second step length value is determined for each dual variable of the plurality of dual variables using a backtracking method applied to iterate to a solution such that $z_k+\tilde{\alpha}_k^{z_k} d^{z_k}>0$, where k is a counter of iterations of (C), $z_k$ indicates a $k^{th}$ plurality of dual variables, $\tilde{\alpha}_k^{z_k}$ indicates a $k^{th}$ step length value for the $k^{th}$ plurality of dual variables, and $d_k^z$ indicates a $k^{th}$ direction vector for the $k^{th}$ plurality of dual variables.

25. A computing device comprising:
a processor; and
a computer-readable medium operably coupled to the processor, the computer-readable medium having computer-readable instructions stored thereon that, when executed by the processor, cause the computing device to
(A) perform an optimality check for a current solution to a predefined objective function, wherein the predefined objective function is a nonlinear equation with a plurality of decision variables;
(B) when the performed optimality check indicates that the current solution is an optimal solution, output the optimal solution to the predefined objective function, wherein the optimal solution includes a value for each decision variable of the plurality of decision variables that optimizes a result of the predefined objective function;
when the performed optimality check indicates that the current solution is not the optimal solution,
(C) perform a complementarity slackness test with the current solution;
(D) based on the result of the performed complementarity slackness test, update a barrier parameter value and update a Lagrange multiplier value for each constraint function of a plurality of constraint functions defined for objective function optimization, wherein each constraint function applies one or more of the plurality of decision variables;
(E) determine a search direction vector by solving a primal-dual linear system that includes a dual variable defined for each constraint function of the plurality of constraint functions, wherein the search direction vector includes a direction value for each decision variable of the plurality of decision variables and for each dual variable of a plurality of dual variables, wherein the search direction vector is determined based on the updated barrier parameter value and the updated Lagrange multiplier value for each constraint function of the plurality of constraint functions;
(F) determine a step length value for each decision variable of the plurality of decision variables and for each dual variable of the plurality of dual variables based on the updated barrier parameter value;
(G) update the current solution to the predefined objective function using the determined search direction vector and the determined step length value for each decision variable of the plurality of decision variables and for each dual variable of the plurality of dual variables; and
(H) perform an iteration check for the updated current solution;
when the performed iteration check indicates that a second set of iterations is needed,
(I) determine a second search direction vector by solving the primal-dual linear system using the updated current solution, the updated barrier parameter value, and the updated Lagrange multiplier value for each constraint function of the plurality of constraint functions, wherein the second search direction vector includes the direction value for each decision variable of the plurality of decision variables and for each dual variable of the plurality of dual variables;
(J) determine a second step length value for each decision variable of the plurality of decision variables and for each dual variable of the plurality of dual variables based on the updated barrier parameter value, wherein the second step length value is determined for each decision variable of the plurality of decision variables and each dual variable of the plurality of dual variables using quadratic coefficient values;
(K) determine a third step length value for each decision variable of the plurality of decision variables and for each dual variable of the plurality of dual variables based on the updated current solution, the updated barrier parameter value, and the determined second step length value by minimizing a primal-dual merit function;
(L) update the current solution to the predefined objective function using the determined second search direction vector and the determined third step length value for each decision variable of the plurality of decision variables and for each dual variable of the plurality of dual variables; and (M) repeat (H) to (L) until the performed iteration check indicates that the second set of iterations is complete; and (N) repeat (A) to (M) until the performed optimality check indicates that the current solution is the optimal solution or a predefined number of iterations of (D) has been performed.

26. A method of determining a solution to a nonlinear optimization problem, the method comprising:

(A) performing, by a computing device, an optimality check for a current solution to a predefined objective function, wherein the predefined objective function is a nonlinear equation with a plurality of decision variables;

(B) when the performed optimality check indicates that the current solution is an optimal solution, outputting, by the computing device, the optimal solution to the predefined objective function, wherein the optimal solution includes a value for each decision variable of the plurality of decision variables that optimizes a result of the predefined objective function;

when the performed optimality check indicates that the current solution is not the optimal solution, (C) performing, by the computing device, a complementarity slackness test with the current solution;

(D) based on the result of the performed complementarity slackness test, updating, by the computing device, a barrier parameter value and updating, by the computing device, a Lagrange multiplier value for each constraint function of a plurality of constraint functions defined for objective function optimization, wherein each constraint function applies one or more of the plurality of decision variables;

(E) determining, by the computing device, a search direction vector by solving a primal-dual linear system that includes a dual variable defined for each constraint function of the plurality of constraint functions, wherein the search direction vector includes a direction value for each decision variable of the plurality of decision variables and for each dual variable of a plurality of dual variables, wherein the search direction vector is determined based on the updated barrier parameter value and the updated Lagrange multiplier value for each constraint function of the plurality of constraint functions;

(F) determining, by the computing device, a step length value for each decision variable of the plurality of decision variables and for each dual variable of the plurality of dual variables based on the updated barrier parameter value;

(G) updating, by the computing device, the current solution to the predefined objective function using the determined search direction vector and the determined step length value for each decision variable of the plurality of decision variables and for each dual variable of the plurality of dual variables; and (H) performing, by the computing device, an iteration check for the updated current solution;

when the performed iteration check indicates that a second set of iterations is needed, (I) determining, by the computing device, a second search direction vector by solving the primal-dual linear system using the updated current solution, the updated barrier parameter value, and the updated Lagrange multiplier value for each constraint function of the plurality of constraint functions, wherein the second search direction vector includes the direction value for each decision variable of the plurality of decision variables and for each dual variable of the plurality of dual variables;

(J) determining, by the computing device, a second step length value for each decision variable of the plurality of decision variables and for each dual variable of the plurality of dual variables based on the updated barrier parameter value, wherein the second step length value is determined for each decision variable of the plurality of decision variables and each dual variable of the plurality of dual variables using quadratic coefficient values;

(K) determining, by the computing device, a third step length value for each decision variable of the plurality of decision variables and for each dual variable of the plurality of dual variables based on the updated current solution, the updated barrier parameter value, and the determined second step length value by minimizing a primal-dual merit function;

(L) updating, by the computing device, the current solution to the predefined objective function using the determined second search direction vector and the determined third step length value for each decision variable of the plurality of decision variables and for each dual variable of the plurality of dual variables; and (M) repeating, by the computing device, (H) to (L) until the performed iteration check indicates that the second set of iterations is complete; and (N) repeating, by the computing device, (A) to (M) until the performed optimality check indicates that the current solution is the optimal solution or a predefined number of iterations of (D) has been performed.

27. The method of claim 26, wherein the primal-dual merit function is $$\Phi(w) = f(x) - \mu \sum_{i \in I} \lambda_i \log\left(\frac{c_i(x)}{\mu} + 1\right) + \nu \mu \sum_{i \in \mathcal{B}} \left(\frac{(c_i(x) + \mu)z_i}{\mu \lambda_i} - \log\left(\frac{(c_i(x) + \mu)z_i}{\mu \lambda_i}\right)\right),$$

where $\Phi(w)$ indicates the primal-dual merit function, $f(x)$ indicates the predefined objective function, $\mu$ indicates the updated barrier parameter value, indicates an $i^{th}$ LaGrange multiplier, $c_i(x)$ indicates an $i^{th}$ constraint function solved with x, x indicates the plurality of decision variables, $\nu$ indicates a predefined scaling parameter value, and $z_i$ indicates an $i^{th}$ dual variable.

28. The method of claim 26, wherein the third step length value is determined for each dual variable of the plurality of dual variables using a backtracking method applied to iterate to a solution that minimizes the primal-dual merit function.

29. The method of claim 26, wherein the quadratic coefficient values are computed using $$q^a = \frac{-1}{(\mu(1-\beta))^2}, \quad q^b = \frac{1-\beta}{\mu(1-\beta)^2},$$

-continued and $q^c = \frac{\beta(2-3\beta)}{2(1-\beta)^2} + \log(1-\beta)$, where $\mu$ indicates the updated barrier parameter value, and $\beta$ indicates a predefined feasibility parameter value.

30. The method of claim 29, wherein the second step length value is determined for each decision variable of the plurality of decision variables using a backtracking method applied to iterate to a solution such that $$\frac{1}{2}q^a(c_i(x_k + \tilde{\alpha}_k^{x_k} d^{x_k}))^2 + q^b c_i(x_k + \tilde{\alpha}_k^{x_k} d^{x_k}) + q^C > 0,$$

where k is a counter of iterations of (C), $x_k$ indicates a $k^{th}$ plurality of decision variables, $\tilde{\alpha}_k^{x_k}$ indicates a $k^{th}$ step length value for the $k^{th}$ plurality of decision variables, $d_k^x$ indicates a $k^{th}$ direction vector for the $k^{th}$ plurality of decision variables, $c(x_k+\alpha_k^x d_k^x)$ indicates the plurality of constraint functions solved with $x_k+\alpha_k^x d_k^x$, $\mu_{k+1}$ indicates the updated barrier parameter value, and $c_i(x_k+\alpha_k^{x_k}d^{x_k})$ indicates an $i^{th}$ constraint function solved with $x_k+\tilde{\alpha}_k^{x_k}d^{x_k}$.

* * * * *

UNITED STATES PATENT AND TRADEMARK OFFICE
CERTIFICATE OF CORRECTION

PATENT NO. : 11,062,219 B1
APPLICATION NO. : 17/106488
DATED : July 13, 2021
INVENTOR(S) : Joshua David Griffin et al.

It is certified that error appears in the above-identified patent and that said Letters Patent is hereby corrected as shown below:

In the Specification

Column 5, Lines 61-64:
Delete the phrase "minimize $f(x_1, x_2) = 100(x_2 - x^2)^2 + (1 - x_t)^2$ subject to $x_t \geq 5$ and $x_t + Sx_2 \geq 76$, where $x_t$ and $x_2$ are decision variables, and $x_t \geq 5$ and $x_t + Sx_2 \geq 76$ are two constraint functions." and replace with --minimize $f(x_1, x_2) = 100(x_2 - x_1^2)^2 + (1 - x_1)^2$ subject to $x_1 \geq 5$ and $x_1 + 5x_2 \geq 76$, where $x_1$ and $x_2$ are decision variables, and $x_1 \geq 5$ and $x_1 + 5x_2 \geq 76$ are two constraint functions.--.

Column 6, Lines 13-16:
Delete the phrase "$t^+ = \max\{t, 0\}$. $\nabla f(x) \in \mathbb{R}^n$ indicates a gradient of $f$ at $x$. $\nabla c(x)^T$ indicates a Jacobian matrix of $c$ at $x$, and is an $m \times n$ matrix, whose $i^{th}$ row is a vector $\nabla c_i(x)^T$," and replace with --$t^+ = \max\{t, 0\}$. $\nabla f(x) \in \mathbb{R}^n$ indicates a gradient of $f$ at $x$. $\nabla c(x)^T$ indicates a Jacobian matrix of $c$ at $x$, and is an $m \times n$ matrix, whose $i^{th}$ row is a vector $\nabla c_i(x)^T$,--.

Column 6, Line 22:
Delete the phrase "$\nabla_x \mathcal{L}(x, z) = \nabla f(x) - \nabla c(x)z$" and replace with --$\nabla_x \mathcal{L}(x, z) = \nabla f(x) - \nabla c(x)z$--.

Column 6, Lines 29-30:
Delete the phrase "where $\nabla_x^2$ indicates a Hessian computation with respect to $x$, and $\nabla_x$ indicates a derivative computation" and replace with --where $\nabla_x^2$ indicates a Hessian computation with respect to $x$, and $\nabla_x$ indicates a derivative computation--.

Column 7, Line 23:
Delete the phrase "while updating X and p" and replace with --while updating $\lambda$ and $\mu$--.

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,062,219 B1

Column 7, Line 35:
Delete the phrase "updating $\lambda_k$ and $p_k$" and replace with --updating $\lambda_k$ and $\mu_k$--.

Column 7, Line 39:
Delete the phrase "$\|C(x_k)z_k\| \leq \alpha\|C(x_{k-1})z_{k-1}\|$" and replace with --$\|C(x_k)z_k\| \leq a\|C(x_{k-1})z_{k-1}\|$--.

Column 7, Line 41:
Delete the phrase "where $\alpha \epsilon (0,1)$. When $\|(x_k)z_k\| \leq \alpha\|C(x_{k-1})z_{k-1}\|$," and replace with --where $a \in (0,1)$. When $\|C(x_k)z_k\| \leq a\|C(x_{k-1})z_{k-1}\|$,--.

Column 7, Line 44:
Delete the phrase "$\|C(x_k)z_k\| \geq \alpha\|C(x_{k-1})z_{k-1}\|$," and replace with --$\|C(x_k)z_k\| > a\|C(x_{k-1})z_{k-1}\|$,--.

Column 7, Line 54:
Delete the phrase "$\|C(x_k)z_k\| \leq \alpha \max\left\{\left\|C\left(x_{i_j}\right)z_{i_j}\right\| : (k-\ell)^+ \leq j \leq k\right\} + \zeta_k$," and replace with --$\|C(x_k)z_k\| \leq a \max\left\{\left\|C\left(x_{i_j}\right)z_{i_j}\right\| : (k-\ell)^+ \leq j \leq k\right\} + \zeta_k$--.

Column 7, Lines 57-58:
Delete the phrase "(or $\|C(x_k)z_k\| \leq \alpha\|C(x_{k-1})z_{k-1}\|$) and $\{\zeta_k\}$" and replace with --(or $\|C(x_k)z_k\| \leq a\|C(x_{k-1})z_{k-1}\|$) and $\{\zeta_k\}$--.

Column 8, Lines 18-19:
Delete the phrase "$\hat{x}_k = x_k + \alpha_k^x d_k^x$ and $\hat{z}_k = z_k + \alpha_k^z d_k^z$, where the step lengths $\alpha_k^x$ and $\alpha_k^x$ are computed" and replace with --$\hat{x}_k = x_k + \alpha_k^x d_k^x$ and $\hat{z}_k = z_k + \alpha_k^z d_k^z$, where the step lengths $\alpha_k^x$ and $\alpha_k^z$ are computed--.

Column 8, Line 28:
Delete the phrase "$z_k + \alpha_k^z d_k^z > 0$." and replace with --$z_k + \alpha_k^z d_k^z > 0$--.

Column 8, Line 62:
Delete the phrase "barrier parameter p" and replace with --barrier parameter $\mu$--.

Column 11, Line 21:
Delete the phrase "$a$ e $(0,1)$," and replace with --$a \in (0,1)$,--.

Column 11, Line 23:
Delete the phrase "$\alpha = 0.9$." and replace with --$a = 0.9$.--.

Column 12, Lines 58-59:
Delete the phrase "$\|C(x_k)z_k\| \leq \alpha\|C(x_{k-1})z_{k-1}\|$ or $\|C(x_k)z_k\| \leq \alpha \max\{\|C(x_{i_j})z_{i_j}\|:(k-\ell)^+ \leq j \leq k\} + \zeta_k$," and replace with --$\|C(x_k)z_k\| \leq a\|C(x_{k-1})z_{k-1}\|$ or $\|C(x_k)z_k\| \leq a \max\{\|C(x_{i_j})z_{i_j}\|:(k-\ell)^+ \leq j \leq k\} + \zeta_k$--.

Column 12, Line 62:
Delete the phrase "$\|C(x_k)z_k\| \leq \alpha \max\{\|C(x_{i_j})z_{i_j}\|:(k-\ell)^+ \leq j \leq k\} + \zeta_k$," and replace with --$\|C(x_k)z_k\| \leq a \max\{\|C(x_{i_j})z_{i_j}\|:(k-\ell)^+ \leq j \leq k\} + \zeta_k$,--.

Column 12, Line 64:
Delete the phrase "$\|C(x_k)z_k\| \leq \alpha \max\{\|C(x_{i_j})z_{i_j}\|:(k-\ell^+ \leq j \leq k\} + \zeta_k$," and replace with --$\|C(x_k)z_k\| \leq a \max\{\|C(x_{i_j})z_{i_j}\|:(k-\ell)^+ \leq j \leq k\} + \zeta_k$,--.

Column 12, Lines 65-66:
Delete the phrase "$\|C(x_k)z_k\| > \alpha \max\{\|C(x_{i_j})z_{i_j}\|:(k-\ell^+ \leq j \leq k\} + \zeta_k$," and replace with --$\|C(x_k)z_k\| > a \max\{\|C(x_{i_j})z_{i_j}\|:(k-\ell)^+ \leq j \leq k\} + \zeta_k$,--.

Column 13, Lines 46-47:
Delete the phrase "$\alpha_{k,g}^{x_{k,g}}$, $g = 1, \ldots, n$ and $\alpha_{k,h}^{z_{k,h}}$, $h = 1, \ldots, m$" and replace with --$\alpha_{k,g}^{x_{k,g}}$, $g = 1, \ldots, n$ and $\alpha_{k,h}^{z_{k,h}}$, $h = 1, \ldots, m$--.

Column 13, Lines 56-57:
Delete the phrase "$\alpha_k^x$ and $\alpha_k^z$" and replace with --$\alpha_k^x$ and $\alpha_k^z$--.

Column 13, Line 66:
Delete the phrase "$\alpha_k^x$." and replace with --$\alpha_k^x$.--.

Column 14, Line 14:
Delete the phrase "$\alpha_k^x$." and replace with --$\alpha_k^x$.--.

Column 14, Line 21:
Delete the phrase "$\alpha_k^x$." and replace with --$\alpha_k^x$.--.

CERTIFICATE OF CORRECTION (continued)
U.S. Pat. No. 11,062,219 B1

Page 4 of 8

Column 14, Line 22:
Delete the phrase "$\alpha_k{}^z = 1$." and replace with --$\alpha_k^z = 1$--.

Column 14, Lines 23-24:
Delete the phrase "If the initial estimate of the dual step length $\alpha_k{}^z$ is not acceptable because $z_k + \alpha_k{}^z d_k{}^z < 0.005 z_k$," and replace with --If the initial estimate of the dual step length $\alpha_k^z$ is not acceptable because $z_k + \alpha_k^z d_k^z < 0.005 z_k$,--.

Column 14, Lines 25-26:
Delete the phrase "$\alpha_k{}^z$ such that $z_k + \alpha_k{}^z d_k{}^z \geq 0.005 z_k$." and replace with --$\alpha_k^z$ such that $z_k + \alpha_k^z d_k^z \geq 0.005 z_k$--.

Column 14, Lines 28-29:
Delete the phrase "$\hat{x}_k = x_{k,g} + \alpha_{k,g}{}^{x_{k,g}} d_{k,g}{}^{x_{k,g}}$ for $g = 1, \ldots, n$ and $\hat{z}_k = z_{k,h} + \alpha_{k,h}{}^{z_{k,h}} d_{k,h}{}^{z_{k,h}}$," and replace with --$\hat{x}_k = x_{k,g} + \alpha_{k,g}^{x_{k,g}} d_{k,g}^{x_{k,g}}$ for $g = 1, \ldots, n$ and $\hat{z}_k = z_{k,h} + \alpha_{k,h}^{z_{k,h}} d_{k,h}^{z_{k,h}}$--.

Column 15, Line 17:
Delete the phrase "$\tilde{\alpha}_{k,h}{}^{w_{k,h}} \in (0, \bar{\alpha}\text{do it9}$," and replace with --$\tilde{\alpha}_{k,h}^{w_{k,h}} \in (0, \bar{\alpha}]$--.

Column 15, Line 28:
Delete the phrase "$\tilde{\alpha}_k{}^x$ and $\tilde{\alpha}_k{}^z$," and replace with --$\tilde{\alpha}_k^x$ and $\tilde{\alpha}_k^z$--.

Column 15, Lines 50-51:
Delete the phrase "$\tilde{\alpha}_{k,h}{}^{w_{k,h}} \in (0, \bar{\alpha}]$," and replace with --$\tilde{\alpha}_{k,h}^{w_{k,h}} \in (0, \bar{\alpha}]$--.

Column 16, Lines 2-3:
Delete the phrase "$\tilde{\alpha}_{k,h}{}^{z_{k,h}}$ is computed, $\tilde{\alpha}_{k,h}{}^{w_{k,h}} = \min(\tilde{\alpha}_{k,h}{}^{x_{k,h}}, \tilde{\alpha}_{k,h}{}^{z_{k,h}})$." and replace with --$\tilde{\alpha}_{k,h}^{z_{k,h}}$ is computed, $\tilde{\alpha}_{k,h}^{w_{k,h}} = \min(\tilde{\alpha}_{k,h}^{x_{k,h}}, \tilde{\alpha}_{k,h}^{z_{k,h}})$--.

Column 16, Line 5:
Delete the phrase "$\alpha_{k,h}{}^{w_{k,h}} \in (0, \tilde{\alpha}_{k,h}{}^{w_{k,h}}]$," and replace with --$\alpha_{k,h}^{w_{k,h}} \in (0, \tilde{\alpha}_{k,h}^{w_{k,h}}]$--.

Column 18, Line 45:
Delete the phrase "*iagrangian*" and replace with --*lagrangian*--.

In the Claims

Claim 5, Column 22, Line 15:

Delete the phrase "∀*f*(*x*)" and replace with --$\nabla f(x)$--.

Claim 5, Column 22, Line 18:
Delete the phrase "∀*c*(*x*)" and replace with --$\nabla c(x)$--.

Claim 5, Column 22, Line 23:
Delete the phrase "$z_i$," and replace with --$z$,--.

Claim 7, Column 22, Line 41:
Delete the phrase "$\|C(x_k)z_k\| \le \alpha \|C(x_{k-1})z_{k-1}\|$," and replace with --$\|C(x_k)z_k\| \le a\|C(x_{k-1})z_{k-1}\|$,--.

Claim 7, Column 22, Line 51:
Delete the phrase "$x_{k-x}$," and replace with --$x_{k-1}$,--.

Claim 8, Column 22, Line 55:
Delete the phrase "$\|C(x_k)z_k\| \le \alpha \max\{\|C(x_{i_j})z_{i_j}\| : (k-\ell^+ \le j \le k\} + \zeta_k$," and replace with --$\|C(x_k)z_k\| \le a \max\{\|C(x_{i_j})z_{i_j}\| : (k-\ell)^+ \le j \le k\} + \zeta_k$,--.

Claim 8, Column 22, Line 66:
Delete the phrase "$i_j^{th}$" and replace with --$i_j^{th}$--.

Claim 9, Column 23, Lines 7-8:
Delete the phrase "$\| C(x_k)z_k \le \alpha \max\{\|C(x_{i_j})z_{i_j}\| : (k-\ell)^+ \le j \le k\} + \zeta_k$," and replace with --$\|C(x_k)z_k\| \le a \max\{\|C(x_{i_j})z_{i_j}\| : (k-\ell)^+ \le j \le k\} + \zeta_k$,--.

Claim 10, Column 23, Lines 19-20:
Delete the phrase "$\|C(x_k)z_k\| \le \alpha \max\{\|C(x_{i_j})z_{i_j}\| : (k-\ell)^+ \le j \le k\} + \zeta_k$," and replace with --$\|C(x_k)z_k\| \le a \max\{\|C(x_{i_j})z_{i_j}\| : (k-\ell)^+ \le j \le k\} + \zeta_k$,--.

Claim 11, Column 23, Lines 22-23:
Delete the phrase "$\|C(x_k)z_k\| > \alpha \max\{\|C(x_{i_j})z_{i_j}\| : (k-\ell)^+ \le j \le k\} + \zeta_k$," and replace with --$\|C(x_k)z_k\| > a \max\{\|C(x_{i_j})z_{i_j}\| : (k-\ell)^+ \le j \le k\} + \zeta_k$,--.

Claim 13, Column 23, Lines 35-36:
Delete the phrase "$\|C(x_k)z_k\| > \alpha \max\{\|C(x_{i_j})z_{i_j}\| : (k-\ell)^+ \le j \le k\} + \zeta_k$," and replace with --$\|C(x_k)z_k\| > a \max\{\|C(x_{i_j})z_{i_j}\| : (k-\ell)^+ \le j \le k\} + \zeta_k$,--.

Claim 14, Column 23, Lines 38-39:
Delete the phrase "$\|C(x_k)z_k\| \leq \alpha \max\{\|C(x_{i_j})z_{i_j}\| : (k-\ell)^+ \leq j \leq k\} + \zeta_k,$" and replace with --$\|C(x_k)z_k\| \leq a \max\{\|C(x_{i_j})z_{i_j}\| : (k-\ell)^+ \leq j \leq k\} + \zeta_k,$--.

Claim 16, Column 23, Lines 52-53:
Delete the phrase "$\hat{x}_k = x_{k,h} + \alpha_{k,h}{}^{x_{k,h}} d_{k,h}{}^{x_{k,h}}$ and $\hat{z}_k = z_{k,h} + \alpha_{k,h}{}^{z_{k,h}} d_{k,h}{}^{z_{k,h}}$" and replace with --$\hat{x}_k = x_{k,h} + \alpha_{k,h}^{x_{k,h}} d_{k,h}^{x_{k,h}}$ and $\hat{z}_k = z_{k,h} + \alpha_{k,h}^{z_{k,h}} d_{k,h}^{z_{k,h}}$--.

Claim 16, Column 23, Line 59:
Delete the phrase "$\alpha_{k,h}{}^{x_{k,h}}$" and replace with --$\alpha_{k,h}^{x_{k,h}}$--.

Claim 16, Column 23, Line 60:
Delete the phrase "$d_{k,h}{}^{x_{k,h}}$" and replace with --$d_{k,h}^{x_{k,h}}$--.

Claim 16, Column 23, Line 62:
Delete the phrase "$\alpha_{k,h}{}^{z_{k,h}}$" and replace with --$\alpha_{k,h}^{z_{k,h}}$--.

Claim 16, Column 23, Line 63:
Delete the phrase "$d_{k,h}{}^{z_{k,h}}$" and replace with --$d_{k,h}^{z_{k,h}}$--.

Claim 17, Column 24, Line 6:
Delete the phrase "$\nabla_x{}^2$" and replace with --$\nabla_x^2$--.

Claim 17, Column 24, Lines 7-9:
Delete the phrase "V indicates a first order derivative, $\nabla_x$ indicates a first order derivative with respect to x," and replace with --$\nabla$ indicates a first order derivative, $\nabla_x$ indicates a first order derivative with respect to x,--.

Claim 17, Column 24, Lines 20-21:
Delete the phrase "U indicates an identity matrix," and replace with --*I* indicates an identity matrix,--.

Claim 18, Column 24, Line 34:
Delete the phrase "$\alpha_k{}^x$" and replace with --$\alpha_k^x$--.

Claim 18, Column 24, Line 35:
Delete the phrase "$d_k{}^x$" and replace with --$d_k^x$--.

Claim 18, Column 24, Line 37:
Delete the phrase "$c(x_k + \alpha_k^x d_k^x)$" and replace with --$c(x_k + \alpha_k^x d_k^x)$--.

CERTIFICATE OF CORRECTION (continued)
U.S. Pat. No. 11,062,219 B1

Claim 18, Column 24, Line 38:
Delete the phrase "$x_k + \alpha_k^x d_k^x$," and replace with --$x_k + \alpha_k^x d_k^x,$--.

Claim 19, Column 24, Line 45:
Delete the phrase "$z_k + \alpha_k^z d_k^z \geq 0.005 z_k$," and replace with --$z_k + \alpha_k^z d_k^z \geq 0.005 z_k,$--.

Claim 19, Column 24, Line 46:
Delete the phrase "$\alpha_k^z$" and replace with --$\alpha_k^z$--.

Claim 19, Column 24, Line 48:
Delete the phrase "$d_k^z$" and replace with --$d_k^z$--.

Claim 20, Column 24, Lines 64-65:
Delete the phrase "and indicates an $i^{th}$ dual variable." and replace with --and $z_i$ indicates an $i^{th}$ dual variable.--.

Claim 23, Column 25, Line 29:
Delete the phrase "$\tilde{\alpha}_k^{x_k}$" and replace with --$\tilde{\alpha}_k^{x_k}$ --.

Claim 23, Column 25, Line 30:
Delete the phrase "$d_k^x$" and replace with --$d_k^x$--.

Claim 23, Column 25, Lines 32-33:
Delete the phrase "$c(x_k + \alpha_k^x d_k^x)$ indicates the plurality of constraint functions solved with $x_k + \alpha_k^x d_k^x$," and replace with --$c(x_k + \alpha_k^x d_k^x)$ indicates the plurality of constraint functions solved with $x_k + \alpha_k^x d_k^x,$--.

Claim 23, Column 25, Lines 34-35:
Delete the phrase "$c_i(x_k + \tilde{\alpha}_k^{x_k} d^{x_k})$ indicates an $i^{th}$ constraint function solved with $x_k + \tilde{\alpha}_k^{x_k} d^{x_k}$," and replace with --$c_i(x_k + \tilde{\alpha}_k^{x_k} d^{x_k})$ indicates an $i^{th}$ constraint function solved with $x_k + \tilde{\alpha}_k^{x_k} d^{x_k}$--.

Claim 24, Column 25, Line 40:
Delete the phrase "$z_k + \tilde{\alpha}_k^{z_k} d^{z_k} > 0$," and replace with --$z_k + \tilde{\alpha}_k^{z_k} d^{z_k} > 0,$--.

Claim 24, Column 25, Line 42:
Delete the phrase "$\tilde{\alpha}_k^{z_k}$" and replace with --$\tilde{\alpha}_k^{z_k}$ --.

Claim 24, Column 25, Line 43:
Delete the phrase "$d_k^z$" and replace with --$d_k^z$--.

CERTIFICATE OF CORRECTION (continued)

Claim 27, Column 28, Lines 52-53:
Delete the phrase "value, indicates an $i^{th}$ LaGrange multiplier," and replace with --value, $\lambda_i$ indicates an $i^{th}$ LaGrange multiplier,--.

Claim 30, Column 29, Line 18:
Delete the phrase "$\tilde{\alpha}_k{}^{x_k}$" and replace with --$\tilde{\alpha}_k^{x_k}$--.

Claim 30, Column 29, Line 19:
Delete the phrase "$d_k^x$" and replace with --$d_k^x$--.

Claim 30, Column 29, Lines 21-22:
Delete the phrase "$c(x_k + \alpha_k^x d_k^x)$ indicates the plurality of constraint functions solved with $x_k + \alpha_k^x d_k^x$," and replace with --$c(x_k + \alpha_k^x d_k^x)$ indicates the plurality of constraint functions solved with $x_k + \alpha_k^x d_k^x$,--.

Claim 30, Column 29, Line 23-24:
Delete the phrase "$c_i(x_k + \alpha_k{}^{x_k} d^{x_k})$ indicates an $i^{th}$ constraint function solved with $x_k + \tilde{\alpha}_k{}^{x_k} d^{x_k}$," and replace with --$c_i(x_k + \tilde{\alpha}_k^{x_k} d^{x_k})$ indicates an $i^{th}$ constraint function solved with $x_k + \tilde{\alpha}_k^{x_k} d^{x_k}$--.